(12) United States Patent
Farb et al.

(10) Patent No.: US 12,276,208 B2
(45) Date of Patent: Apr. 15, 2025

(54) SLEEVES FOR TURBINE SHAFTS

(71) Applicant: Flower Turbines, Inc., Lawrence, NY (US)

(72) Inventors: Mark Daniel Farb, Lawrence, NY (US); Jonathan Forbes, Lauderhill, FL (US); Irakli Baitish, Haifa (IL); James Boyle, Omaha, NE (US)

(73) Assignee: Flower Turbines, Inc., Lawrence, NY (US)

( * ) Notice: Subject to any disclaimer, the term of this patent is extended or adjusted under 35 U.S.C. 154(b) by 0 days.

(21) Appl. No.: 18/392,971

(22) Filed: Dec. 21, 2023

(65) Prior Publication Data
US 2024/0125239 A1     Apr. 18, 2024

Related U.S. Application Data

(63) Continuation of application No. PCT/US2023/074425, filed on Sep. 18, 2023.
(Continued)

(51) Int. Cl.
*F03D 3/06* (2006.01)
*F01D 5/30* (2006.01)

(52) U.S. Cl.
CPC .................. *F01D 5/303* (2013.01)

(58) Field of Classification Search
None
See application file for complete search history.

(56) References Cited

U.S. PATENT DOCUMENTS 1,352,952 A * 9/1920 Gracey .................. F03D 3/067
                                                                    416/118
1,581,537 A * 4/1926 Hennigh .................. F03D 3/067
                                                                    416/117
(Continued)

FOREIGN PATENT DOCUMENTS

| CA | 2800765 A1 | 12/2010 |
| CN | 2409347 Y | 12/2000 |

(Continued)

OTHER PUBLICATIONS

International Search Report and Written Opinion for International Application No. PCT/US2022/082035 dated Jan. 9, 2023 (6 pages).
(Continued)

*Primary Examiner* — Kayla Mccaffrey
(74) *Attorney, Agent, or Firm* — Finnegan, Henderson, Farabow, Garrett & Dunner LLP

(57) ABSTRACT

A fluid turbine may include a vertically-orientable shaft having at least one opening extending transversely therethrough, a first blade portion configured for vertical orientation on first side of the shaft, a second blade portion configured for vertical orientation on a second opposite side of the shaft, at least one rod extending through the shaft opening and connectable at a first end to the first blade portion and at a second end to the second blade portion. A reinforcing sleeve may extend through the shaft opening and may be interposed between the rod and the shaft opening for reinforcing at least one of the shaft, the at least one shaft opening, or the rod against forces exerted by the first and second blade portions when fluid impacts the first and second blade portions.

18 Claims, 14 Drawing Sheets

Related U.S. Application Data

(60) Provisional application No. 63/418,623, filed on Oct. 24, 2022, provisional application No. 63/408,486, filed on Sep. 21, 2022, provisional application No. 63/407,689, filed on Sep. 18, 2022.

(56) References Cited

U.S. PATENT DOCUMENTS

| | | | |
|---|---|---|---|
| 4,036,360 | A | 7/1977 | Deffeyes |
| 4,714,225 | A | 12/1987 | Skinner |
| 4,973,219 | A | 11/1990 | Brickner et al. |
| 5,044,878 | A | 9/1991 | Wilhelm |
| 5,143,170 | A | 9/1992 | Hunt et al. |
| 5,624,006 | A | 4/1997 | Richardson, Jr. |
| 5,798,631 | A | 8/1998 | Spee |
| 6,601,348 | B2 | 8/2003 | Banks |
| 6,606,828 | B1 | 8/2003 | Lin |
| 6,755,608 | B2 | 6/2004 | Boughton |
| 6,784,566 | B2 | 8/2004 | Thomas |
| 6,786,018 | B2 | 9/2004 | Webb |
| 6,824,073 | B1 | 11/2004 | Haney |
| 7,084,520 | B2 | 8/2006 | Zambrano |
| 7,215,039 | B2 | 5/2007 | Zambrano |
| 7,276,809 | B2 | 10/2007 | Zambrano |
| 7,315,093 | B2 | 1/2008 | Graham |
| 7,487,618 | B2 | 2/2009 | Lin |
| 7,592,537 | B1 | 9/2009 | West |
| 7,679,207 | B2 | 3/2010 | Cory |
| 7,836,642 | B2 | 11/2010 | Lin |
| 7,891,573 | B2 | 2/2011 | Finkam |
| 7,902,688 | B2 | 3/2011 | Krivcov |
| 7,944,067 | B2 | 5/2011 | Kammer |
| 7,988,413 | B2 | 6/2011 | Haar |
| RE43,014 | E | 12/2011 | Zambrano |
| 8,188,611 | B2 | 5/2012 | Farb |
| 8,207,623 | B2 | 6/2012 | Rivas |
| 8,251,638 | B2 | 8/2012 | Boyd |
| 8,257,020 | B2 | 9/2012 | Graham |
| 8,333,564 | B2 | 12/2012 | Krivcov |
| 8,364,323 | B2 | 1/2013 | Arinaga |
| 8,491,262 | B2 | 7/2013 | McGrath |
| 8,648,483 | B2 | 2/2014 | Haar |
| 8,696,313 | B2 * | 4/2014 | Deeley ............... F03D 3/068 416/117 |
| 8,840,360 | B2 | 9/2014 | Quintal |
| 8,888,438 | B2 | 11/2014 | Beane |
| 9,041,238 | B2 | 5/2015 | McMahon |
| 9,051,918 | B1 | 6/2015 | Hench |
| 9,127,646 | B2 | 9/2015 | Cory |
| 9,157,664 | B2 | 10/2015 | Place |
| 9,328,717 | B1 | 5/2016 | Walker |
| 9,371,661 | B2 | 6/2016 | Grace |
| 9,453,496 | B2 | 9/2016 | Farb |
| 9,689,372 | B2 | 6/2017 | Gonzalez |
| 9,803,799 | B1 | 10/2017 | Yang |
| 9,835,138 | B2 | 12/2017 | Westergaard |
| 10,006,438 | B2 | 6/2018 | de Boer |
| 10,095,245 | B2 | 10/2018 | Nutt |
| 10,330,086 | B2 | 6/2019 | Farb |
| 10,400,746 | B1 | 9/2019 | Shoffler |
| 10,400,747 | B2 | 9/2019 | Guignard |
| 10,605,229 | B2 | 3/2020 | Zhang |
| 10,612,519 | B2 | 4/2020 | Franke et al. |
| 10,767,630 | B1 | 9/2020 | Venkitanarayanan |
| 10,988,923 | B2 | 4/2021 | Dyson |
| 11,060,501 | B1 | 7/2021 | McMahon |
| 11,060,502 | B2 * | 7/2021 | Wang ............... F03D 3/005 |
| 11,143,162 | B2 | 10/2021 | Vail |
| 11,143,164 | B1 | 10/2021 | Landis |
| 11,208,982 | B2 * | 12/2021 | Palamara ............... F03D 1/02 |
| 11,391,262 | B1 | 7/2022 | Westergaard |
| 11,831,164 | B2 | 11/2023 | Farb |
| 11,891,980 | B2 | 2/2024 | Farb |
| 11,905,929 | B2 | 2/2024 | Farb |
| 12,012,928 | B2 * | 6/2024 | Omdahl ............... F03D 3/005 |
| 2002/0040555 | A1 | 4/2002 | Banks et al. |
| 2002/0083666 | A1 | 7/2002 | Webb |
| 2002/0105190 | A1 | 8/2002 | Thomas |
| 2002/0114692 | A1 | 8/2002 | Boughton |
| 2002/0125880 | A1 | 9/2002 | Murai |
| 2004/0164561 | A1 * | 8/2004 | Nagawa ............... F03D 3/067 290/55 |
| 2005/0034937 | A1 | 2/2005 | Agardy |
| 2005/0143221 | A1 | 6/2005 | Kuwahara |
| 2005/0242590 | A1 | 11/2005 | Zambrano |
| 2006/0131889 | A1 | 6/2006 | Corten |
| 2006/0153682 | A1 | 7/2006 | Vanderhye |
| 2006/0170222 | A1 | 8/2006 | Zambrano |
| 2007/0152454 | A1 | 7/2007 | Zambrano |
| 2007/0176431 | A1 | 8/2007 | Graham |
| 2007/0222225 | A1 | 9/2007 | Mahoney |
| 2008/0083689 | A1 | 4/2008 | Schroeder |
| 2008/0223982 | A1 | 9/2008 | Pri-Paz |
| 2008/0284170 | A1 | 11/2008 | Cory |
| 2008/0284171 | A1 | 11/2008 | Cory |
| 2009/0040750 | A1 | 2/2009 | Myer |
| 2009/0097981 | A1 | 4/2009 | Gabrys |
| 2009/0186745 | A1 | 7/2009 | Lewiston |
| 2009/0220342 | A1 | 9/2009 | Wu et al. |
| 2009/0224556 | A1 | 9/2009 | Berenda et al. |
| 2009/0243295 | A1 | 10/2009 | Kammer |
| 2009/0267351 | A1 | 10/2009 | Buns |
| 2009/0269209 | A1 | 10/2009 | Urban |
| 2009/0278352 | A1 | 11/2009 | Rivas |
| 2009/0290972 | A1 | 11/2009 | Farb |
| 2009/0297332 | A1 | 12/2009 | Boyd |
| 2010/0140939 | A1 | 6/2010 | Scholte-Wassink |
| 2010/0252706 | A1 | 10/2010 | Hargis |
| 2011/0037269 | A1 | 2/2011 | Poon et al. |
| 2011/0089701 | A1 | 4/2011 | Blake |
| 2011/0111700 | A1 | 5/2011 | Hacket |
| 2011/0164977 | A1 | 7/2011 | Vallejo |
| 2011/0215640 | A1 | 9/2011 | Donnelly |
| 2011/0302864 | A1 | 12/2011 | Ramsay |
| 2011/0304150 | A1 | 12/2011 | Hara |
| 2011/0311364 | A1 * | 12/2011 | Conner ............... F03D 3/061 416/243 |
| 2012/0056424 | A1 | 3/2012 | Holstein |
| 2012/0068470 | A1 | 3/2012 | Farb |
| 2012/0169052 | A1 | 7/2012 | Leipold-Buettner |
| 2012/0175879 | A1 | 7/2012 | Keech |
| 2012/0187695 | A1 | 7/2012 | Desplats |
| 2012/0189448 | A1 | 7/2012 | Jaquier |
| 2012/0217824 | A1 | 8/2012 | Gupta |
| 2012/0265356 | A1 | 10/2012 | Yasugi |
| 2013/0008242 | A1 | 1/2013 | Sakaguchi |
| 2013/0114312 | A1 | 5/2013 | Reichard |
| 2013/0197704 | A1 | 8/2013 | Pan |
| 2013/0207624 | A1 | 8/2013 | Aaltonen |
| 2013/0219812 | A1 | 8/2013 | Goodman et al. |
| 2013/0313827 | A1 | 11/2013 | Lovmand et al. |
| 2013/0333689 | A1 | 12/2013 | Umemoto |
| 2014/0010656 | A1 | 1/2014 | Nies |
| 2014/0145550 | A1 | 5/2014 | Hitchcock |
| 2014/0150774 | A1 | 6/2014 | Chang |
| 2014/0150843 | A1 | 6/2014 | Pearce |
| 2014/0150845 | A1 | 6/2014 | Chang |
| 2014/0234103 | A1 | 8/2014 | Obrecht |
| 2015/0076828 | A1 | 3/2015 | Palethorpe |
| 2015/0123401 | A1 | 5/2015 | Vigars |
| 2015/0137519 | A1 | 5/2015 | Tarnowski |
| 2015/0377213 | A1 | 12/2015 | Deshpande |
| 2016/0222946 | A1 | 8/2016 | Krings |
| 2016/0312768 | A1 | 10/2016 | Takakura |
| 2017/0054301 | A1 | 2/2017 | Fintzos |
| 2017/0058899 | A1 | 3/2017 | Ichihara |
| 2017/0074249 | A1 | 3/2017 | Smook |
| 2017/0114778 | A1 | 4/2017 | Madson |
| 2017/0214249 | A1 | 7/2017 | Seeley |
| 2017/0298902 | A1 | 10/2017 | Gdovic |
| 2017/0324367 | A1 | 11/2017 | Collins |
| 2018/0010576 | A1 | 1/2018 | Brake et al. |
| 2018/0097360 | A1 | 4/2018 | Batten |
| 2018/0110328 | A1 | 4/2018 | Mayer |

(56) References Cited

U.S. PATENT DOCUMENTS

| | | |
|---|---|---|
| 2018/0142669 A1 | 5/2018 | Cho et al. |
| 2018/0171972 A1 | 6/2018 | Merz et al. |
| 2018/0175661 A1 | 6/2018 | Tuerk |
| 2018/0238305 A1 | 8/2018 | McMahon |
| 2018/0301906 A1 | 10/2018 | Qureshi |
| 2018/0306169 A1 | 10/2018 | Dharmadhikari et al. |
| 2018/0340515 A1 | 11/2018 | Hitachi |
| 2019/0052206 A1 | 2/2019 | Noderer |
| 2019/0093628 A1 | 3/2019 | Lin |
| 2019/0186145 A1 | 6/2019 | Farb |
| 2019/0360469 A1 | 11/2019 | De Boer |
| 2020/0106295 A1 | 4/2020 | Trzemzalski |
| 2020/0232446 A1 | 7/2020 | Hawkins |
| 2020/0280281 A1 | 9/2020 | Vaidyanathan |
| 2021/0033062 A1 | 2/2021 | Mishra |
| 2021/0075252 A1 | 3/2021 | Caamano et al. |
| 2021/0098994 A1 | 4/2021 | White |
| 2021/0126541 A1 | 4/2021 | Zhang |
| 2021/0148330 A1 | 5/2021 | Kukkonen |
| 2021/0164442 A1 | 6/2021 | Bonfiglio |
| 2021/0262441 A1 | 8/2021 | Jacobsen |
| 2021/0262443 A1 | 8/2021 | Goldblatt |
| 2021/0301784 A1 | 9/2021 | Cory |
| 2022/0060016 A1 | 2/2022 | Mitsunaga |
| 2022/0077686 A1 | 3/2022 | Ma |
| 2022/0263457 A1 | 8/2022 | Akhavan-Tafti |
| 2022/0299959 A1 | 9/2022 | Schirmer |
| 2022/0321052 A1 | 10/2022 | Sassi |
| 2022/0407349 A1 | 12/2022 | Owens |
| 2023/0061818 A1 | 3/2023 | Westergaard |
| 2023/0092176 A1 | 3/2023 | Ricketts |
| 2023/0141320 A1 | 5/2023 | Sepulveda Gonzalez |
| 2023/0184218 A1 | 6/2023 | Lund |
| 2023/0246584 A1 | 8/2023 | Perret |
| 2023/0250793 A1 | 8/2023 | Farb et al. |
| 2023/0250801 A1 | 8/2023 | Farb |
| 2023/0250804 A1 | 8/2023 | Farb |
| 2023/0283079 A1 | 9/2023 | Weaver |
| 2023/0323858 A1 | 10/2023 | Farb |
| 2023/0340936 A1 | 10/2023 | Gaber |
| 2023/0402739 A1 | 12/2023 | Hoganson |
| 2024/0060468 A1 | 2/2024 | Abdallah |
| 2024/0183332 A1* | 6/2024 | Lemine .................. F03D 3/067 |

FOREIGN PATENT DOCUMENTS

| | | |
|---|---|---|
| CN | 103683622 A | 3/2014 |
| CN | 109630360 A | 4/2019 |
| CN | 107131099 B | 11/2019 |
| CN | 113272545 A | 8/2021 |
| EP | 3096004 A1 | 11/2016 |
| EP | 3023636 B1 | 4/2021 |
| EP | 3885574 B1 | 2/2024 |
| GB | 2440264 A | 1/2008 |
| JP | 2007107496 | 4/2007 |
| KR | 20100039917 A | 4/2010 |
| KR | 20110008951 A | 9/2011 |
| KR | 101476673 B1 | 12/2014 |
| KR | 102060281 B1 | 12/2019 |
| RU | 2588914 C2 | 7/2016 |
| WO | 2013073930 A1 | 5/2013 |
| WO | 2013174090 A1 | 11/2013 |
| WO | 2013175035 A1 | 11/2013 |
| WO | 2018029401 A1 | 2/2019 |
| WO | 2020254161 A1 | 6/2020 |
| WO | 20200150108 A1 | 7/2020 |
| WO | 2021231485 A1 | 11/2021 |
| WO | 2023028203 A1 | 3/2023 |

OTHER PUBLICATIONS

International Search Report and Written Opinion for International Application No. PCT/US2023/074425 dated Mar. 28, 2024 (8 pages).

"Outer Rotor Permanent Magnet Direct Drive Wind Turbine" dated XX, https://www.pengky.cn/zz-direct-drive-turbine/external-rotor-generator/external-rotor-generator.html (Last accessed May 4, 2023).

Francisco Haces-Fernandez, Hua Li, David Ramirez, "Improving wind farm power output through deactivating selected wind turbines, Energy Conversion and Management", vol. 187, 2019, pp. 407-422, ISSN 0196-8904.

PCT International Search Report and Written Opinion mailed Jul. 28, 2023, issued in corresponding International Application No. PCT/US23/62170 (6 pgs.).

Blum, Franz, et al. "Device for providing a platform on the roof of a building", May 14, 2020, EPO, DE 102018128308-A1 (Year: 2020).

Arias, Vega Fernando et al., "Mounting for Instruments on Buildings and Method for Installing Same", Oct. 15, 2012, ES-2388388-A1 (Year: 2012).

Guetty, Richard Jean Claude, "Covering Element for Houses, Motor-Vehicles or the Like", Mar. 30, 2015, Romanian Patent Office, RO 130984A2 (Year: 2016).

Berhanu et al., "Numerical and experimental investigation of an exhaust air energy recovery Savonius wind turbine for power production," Science Direct, (2021), https://doi.org/10.1016/j.matpr.2021.02.675.

Chong et al., "Design of an exhaust air energy recovery wind turbine generator for energy conservation in commercial buildings," Science Direct, vol. 67, pp. 252-256, (2014). https://doi.org/10.1016/j.renene.2013.11.028.

Singh et al., "Recovery of Energy From Exhaust Air of Textile Industry With the Help of VAWT," International Research Journal of Engineering and Technology (IRJET), 7(3), 4820-4828, (2020).

Ismail et al., "Study On the Potentiality of Power Generations from Exhaust Air Energy Recovery Wind Turbine: A Review," Journal of Advanced Research in Fluid Mechanics and Thermal Sciences, 87(3), 148-171, (2021), https://doi.org/10.37934/arfmts.87.3.148171.

Shahid, Rehan, "Generating Electricity From Exhaust Air Using Wind Turbine", Aug. 5, 2015, Retrieved from: https://www.linkedin.com/pulse/generating-electricity-using-exhaust-air-rehan-shahid. (Year: 2015).

Daniel, Mark Farb. 2023. Leaves on a Pole. U.S. Appl. No. 29/883,242, filed Jan. 26, 2023.

Howland, M.F., Quesada, J.B., Martinez, J.J.P. et al. "Collective wind farm operation based on a predictive model increases utility-scale energy production." Nat Energy 7, 818-827 (2022).

M. Pape and M. Kazerani, "Turbine Startup and Shutdown in Wind Farms Featuring Partial Power Processing Converters," in IEEE Open Access Journal of Power and Energy, vol. 7, pp. 254-264, 2020, doi: 10.1109/OAJPE.2020.3006352.

PCT International Search Report and Written Opinion mailed Nov. 23, 2023, issued in corresponding International Application No. PCT/US2023/065609 (17 pgs.).

Syahputra et al. "Performance Improvement for Small-Scale Wind Turbine System Based on Maximum Power Point Tracking Control." in: Energies 2019, 12(20), Oct. 17, 2019, [online] [retrieved on Dec. 27, 2023 (Dec. 27, 2023)] Retrieved from the Internet < URL: https://www.mdpi.com/1996-1073/12/20/3938 >, entire document.

International Search Report and Written Opinion for PCT/US2023/073016 dated Feb. 8, 2024, 9 pages.

"Each Wind Harvester Project in 2023 and 2024 will advance our commercialization objectives" Wind Harvest International, 2023, Inc. https://windharvest.com/about/projects/ (Last accessed on Feb. 17, 2023).

Chandler D.L., "A new method boosts wind farms' energy output, without new equipment," MIT News, Aug. 22, 2022.

International Search Report and Written Opinion, dated Sep. 13, 2023, issued in International Patent Application No. PCT/US2023/65612 (10 pages).

International Search Report and Written Opinion, dated Jun. 21, 2024, issued in International Patent Application No. PCT/US2024/011337 (11 pages).

Chandler, David L. (2024). "MIT engineers' new theory could improve the design and operation of wind farms," MIT News on

(56) References Cited

OTHER PUBLICATIONS

Campus and Around the World. Retrieved from https://news.mit.edu/2024/new-theory-could-improve-design-and-operation-wind-farms-0821.

International Search Report and Written Opinion, dated Aug. 14, 2024, issued in International Patent Application No. PCT/US24/23527.

Tran et al., "The aerodynamic interference effects of a floating offshore wind turbine experiencing platform pitching and yawing motions", Jun. 2014, Journal of Mechanical Science and Technology 29 (2) (2015) 549-561. (Year: 2014).

Chen et al., "Interactions between approaching flow and hydrokinetic turbines in a staggered layout", Jun. 2023, Renewable Energy 218 (2023) 119339. (Year: 2023).

Wei et al., "An experimental study on the effects of relative rotation direction on the wake interferences among tandem wind turbines", Jan. 2014, Science China Physics, Mechanics & Astronomy, May 2014 vol. 57 No. 5: 935-949. (Year: 2014).

Kevin Sehn, "Aerodynamic Mitigation of Extreme Wind Loading on Low-rise Buildings", 2008, Iowa State University, UMI No. 1453904 (Year: 2008).

\* cited by examiner

SLEEVES FOR TURBINE SHAFTS

CROSS REFERENCES TO RELATED APPLICATIONS

This application is a continuation of PCT International Application No. PCT/US2023/074425, filed Sep. 18, 2023, which claims the benefit of priority of U.S. Provisional Patent Application No. 63/407,689, filed Sep. 18, 2022, U.S. Provisional Patent Application No. 63/408,486, filed on Sep. 21, 2022, and U.S. Provisional Patent Application No. 63/418,623 filed Oct. 24, 2022, the entire contents of all of which are incorporated herein by reference.

TECHNICAL FIELD

The present disclosure generally relates to the field of fluid turbines. More specifically, the present disclosure relates to systems, methods, and devices for mechanical aspects of vertical fluid turbines.

BACKGROUND

As challenges posed by climate change continue to increase, more attention is being devoted to green energy alternatives to fossil fuels. Some attractive alternatives to fossil fuels include turbines that harness power from a fluid flow, such as wind, ocean currents, a steam flow, or a gas flow. While high speed fluid flows may allow fluid turbines to generate sufficient levels of energy to make these sources of green energy feasible alternatives to fossil fuels, this may also cause wear and damage to one or more mechanical components, requiring maintenance and/or replacement. Additionally or alternatively, fluid flows may be associated with unpredictable and/or chaotic streams and/or currents that may cause wear and/or damage one or more mechanical parts. For example, air flow may induce one or more components of a wind turbine to vibrate, shake, warp, buckle, shake, and/or twist. These motions may be transferred to other connected components, which may cause stress, deformities and/or breakage. Although some mechanical parts may be reinforced to withstand such stresses, reinforcements can add weight and/or bulk to the turbine, which may hamper performance.

SUMMARY

Embodiments consistent with the present disclosure provide systems and methods generally relating to operating one or more fluid turbines.

Consistent with disclosed embodiments, systems and methods are provided for assembling a vertically-oriented fluid turbine. The embodiments may include a fluid turbine, comprising: a vertically-orientable shaft having at least one opening extending transversely therethrough; a first blade portion, configured for vertical orientation on first side of the shaft; a second blade portion, configured for vertical orientation on second side of the shaft, opposite the first side; at least one rod extending through the at least one shaft opening and connectable at a first end thereof to the first blade portion, and at a second end thereof to the second blade portion; and at least one reinforcing sleeve extending through the at least one shaft opening and being interposed between the at least one rod and the at least one shaft opening for reinforcing at least one of the shaft, the at least one shaft opening, or the at least one rod against forces exerted by the first blade portion and the second blade portion when fluid impacts the first blade portion and the second blade portion.

DETAILED DESCRIPTION

Figure 1C:
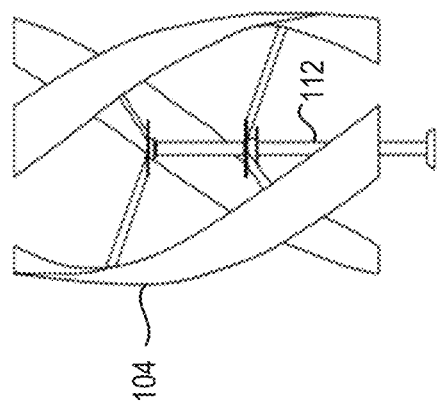
FIGS. 1A-1C illustrate an exemplary variety of vertically-oriented fluid turbines, each of which is consistent with some embodiments of the present disclosure.

Disclosed herein are systems, methods for reinforcing one or more fluid turbines. The fluid turbines referred to herein may be configured to harness energy from wind, water, steam, and/or gas flow. The disclosed reinforcements may protect a fluid turbine from stress, wear, deformities, and/or breakage due to vibrations, wobbling, shaking, twisting, and/or buckling motion induced by fluid flow on one or more of the turbine blades. The disclosed reinforcements may be located substantially in a central shaft of the fluid turbine to thereby avoid increasing a moment of inertia which may cause a slowing of a rotational speed of the fluid turbine.

Although some non-limiting examples are given relating to wind turbines (specifically vertical wind turbines), these examples are intended for illustrative purposes only, and do not limit this disclosure. Furthermore, in some cases the term "fluid turbine" may be understood to include an electric energy generator in an integral fluid energy conversion system.

Various terms used in this detailed description and in the claims may be defined or summarized differently when discussed in connection with differing disclosed embodiments. It is to be understood that the definitions, summaries, and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily lack that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

Aspects of the present disclosure is directed to systems, devices, methods, and non-transitory computer readable media for operating one or more fluid turbines (e.g., a cluster of fluid turbines) under variable fluid conditions. In some cases, each fluid turbine in a cluster may be exposed to substantially the same environmental factors (e.g., the same or similar wind conditions, water current, and temperature). Under low fluid conditions, energy produced by one or more fluid turbines may fail to meet one or more threshold requirements associated with supplying generated electrical energy to an electrical grid. For instance, AC voltage generated under low fluid conditions may fail to meet a threshold for an inverter and/or an electrical grid requirement. Low fluid conditions may refer to a fluid having a fluid velocity below a minimal fluid flow threshold. For example, a fluid velocity above the minimal power threshold may be necessary for a fluid turbine to generate power. Disclosed embodiments may allow harnessing energy generated under low fluid conditions to increase operational efficiency of one or more fluid turbines and facilitate compliance with one or more standards and/or regulations for supplying AC power to an electrical grid.

A flow (e.g., a fluid flow) may refer to movement or continual deformation of a fluid under an applied force. Flow may correspond to kinetic energy of particles or molecules of a fluid. For example, a temperature gradient in a fluid may cause warmer fluid to rise and cooler fluid to sink in a cyclical flow motion. Uneven heating of the Earth by the sun (e.g., combined with the Earth's rotation) may cause wind (e.g., airflow). Similarly, wind, water density differentials, gravity, and the Earth's rotation may cause ocean currents (e.g., water flow). Examples of turbines for obtaining energy from a flow may include a windmill, a waterwheel, a steam turbine, or a gas turbine.

A wind flow may refer to a fluid flow consisting of air. A water flow may refer to a fluid flow consisting of water, e.g., as an ocean or river current.

A fluid turbine may include a mechanical device configured to capture energy from a fluid flow (e.g., a flow of water, steam, gas, or wind) and convert the captured energy to a form of work (e.g., a rotary motion). A fluid turbine may include at least one moving part coupled to a plurality of blades connected to a shaft. A fluid turbine may rotate, for example, in response to an air flow incident on a plurality of blades or in response to water flow on an impeller (e.g., paddle wheel, a water wheel), or in response to steam or gas flow. The plurality of blades and shaft may be connected to a rotor of an electric energy generator for converting the mechanical rotational motion of the plurality of blades and shaft to electrical energy, as described in greater detail below. A fluid turbine may have a horizontal axis of rotation (e.g., the axis around which the fluid turbine rotates is substantially parallel to the ground or flow), or a vertical axis of rotation (e.g., the axis around which the fluid turbine rotates is at a right angle to the ground or flow). In some embodiments the axis of rotation may be neither horizontal or vertical, and in other embodiments, the axis of rotation may be variable. A fluid turbine may begin generating power when a fluid flow exceeds a lower threshold (e.g., a cut-in value).

A shaft of a fluid turbine may include a pole, a rod, a post, a support, a pylon, or any other axle or axis. In some embodiments, a shaft may be used to support one or more objects. For example, blades of a vertical fluid turbine may be connected to a shaft allowing the blades to be supported vertically by the shaft which may rotate with the blades. Connecting the shaft with the blades to a rotor may allow transferring kinetic energy of a flowing fluid to a rotary motion by the rotor to produce electrical energy. As another example, blades of an impeller may be connected to a horizontally oriented shaft that may rotate with the blades, A blade (e.g., as part of a plurality of blades) of a turbine may refer to an object having a cross-sectional shape having a curved surface (e.g., an airfoil shape or a cupped shape typical of drag-type turbines) configured to cause a motion (e.g., a rotational motion) consistent with the fluid motion incident on the blades. A fluid turbine may include a plurality of blades mounted onto a rim of a disc. Movement of a fluid across the blades may produce a tangential force that may cause rotation of a rotor connected thereto. Moving fluid may act on the blades of a fluid turbine causing the blades to rotate and impart rotational energy to a rotor. The blades may extend from the rotor in that they protrude from the rotor or from a mounting plate mechanically connected to the rotor. Connecting a plurality of blades to a rotor (e.g., directly or indirectly) may cause the plurality of blades to extend outwards and/or upwards from the rotor.

A cluster of fluid turbines may refer to a plurality of fluid turbines positioned in relative proximity to each other, to form a group or collection of fluid turbines. A cluster of fluid turbines may include at least two fluid turbines at a location including a plurality of fluid turbines. In some embodiments, a cluster of fluid turbines may include all of the fluid turbines at a location. In some embodiments, a cluster of fluid turbines may include fewer than all of the fluid turbines at a location. Clustered fluid turbines may be positioned in an arrangement such that each fluid turbine may be exposed to substantially similar environmental conditions and fluid flow (e.g., wind conditions, temperature, precipitation, water current). In some embodiments, at least some of clustered fluid turbines may be fluidly coupled such that blade motion of a fluidly-coupled upstream fluid turbine may cause a fluid flow or turbulence that may affect or influence the blade motion of a fluidly-coupled downstream fluid turbine in the cluster. In some embodiments, each clustered fluid turbine may be fluidly coupled with at least one other fluid turbine. In some embodiments, at least one clustered fluid turbine may be independent such that blade motion of the independent clustered turbine may be indifferent to blade motion of any other clustered fluid turbine, and may not affect blade motion of any other clustered fluid turbine. In some embodiments, each fluid turbine in a cluster may be independent.

Electrical energy may refer to energy associated with electrically charged particles. Electrical energy may be supplied as current (e.g., an electron flow) through an electric potential (e.g., voltage). A fluid turbine coupled to an energy generator may convert mechanical energy (e.g., in a fluid flow) to electrical energy for supplying to an electrical energy sink, such as a capacitor, a battery, an electrical load, and/or an electrical grid.

A voltage may refer to an electrical potential difference between two points. A voltage may be associated with a tension between two points to reduce or eliminate an electrical potential difference therebetween. For example the tension may be reduced by a current flowing from one point to the other point, e.g., crossing the electrical potential difference.

Power (e.g., electric power) may refer to a rate at which electrical energy may be transferred by an electric circuit. Electric power may be measured in watts (e.g., Kilowatts, or Megawatts) and may refer to a rate of electrical energy transferred by an electric circuit. Power may be calculated from a known voltage and/or current level (e.g., watts=volts×amps). Electric power may be generated by an electric energy generator (e.g., connected to a fluid turbine). As used herein, the phrase "power generated by a fluid turbine" or "power output from a fluid turbine" may refer to power generated by an energy generator associated with the fluid turbine.

An energy generator (e.g., an alternator) may include a device configured to convert motive or mechanical power to electric power. An energy generator may include a rotor and a stator in which windings (e.g., copper wires) may be electromagnetically coupled to an alternating magnetic field for conversion of non-electrical energy (e.g. rotational or kinetic energy) to electrical energy. An energy generator may be associated with a fluid turbine (e.g., steam, water, air, and/or gas turbine). Mechanical energy as rotational motion of a fluid turbine may be transferred to a rotor of an electric generator. The rotational motion of the rotor may cause an alternating magnetic field to surround the windings, which may induce an alternating current, thereby converting mechanical energy to electrical energy. In some embodiments, the rotor may include a magnet or magnets, and the stator may include windings. In some embodiments, the rotor may include windings and the stator may include a magnet or magnets. In some embodiments, a rotor may be configured to rotate within a stator (e.g., a stator may be formed as a ring or donut surrounding a rotor.) In some embodiments, a rotor may be configured to rotate about a stator (e.g., a rotor may be formed as a ring or donut surrounding a stator). In some embodiments, a rotor of an energy generator may be connected to rotatable blades and/or a rotatable shaft of a fluid turbine, allowing the rotor to rotate in response to a fluid flow.

A rotor may refer to a rotating component of an electromagnetic system (e.g., an electric motor, electric energy generator, or an alternator). A rotor may rotate, turn, or spin to induce a torque around an axis of the rotor. A stator may refer to a stationary (e.g., non-moving) component of a rotary electromagnetic system. A rotor electromagnetically coupled to a stator may allow for interactions between an electromagnetic coil of an electric conducting wire (e.g., windings) and an alternating magnetic field. The interactions may allow conversion of electrical energy to mechanical energy as rotational motion (e.g., as in a motor) and to convert mechanical energy as rotational motion to electrical energy (e.g., as in an electric energy generator). For example, energy may flow from a rotating component to a stator, as in an energy generator where a stator may convert a rotating magnetic field to an alternating electric current.

Electronic circuitry may include any combination of electronic components (e.g., one or more of memory units, switches, transistors, diodes, gates, capacitors, inductors, resistors, transformers, converters, inverters, rectifiers, DC-DC converters, more power supplies, voltage sensors, current sensors, or other electronic componentry) connected via one or more connecting wires and/or contacts for performing one or more operations (e.g., logical operations) in response to receiving an electric signal as an input (e.g., from at least one processor operating as a controller). Circuitry may include one or more integrated circuits (ICs), including one or more processors. Circuitry may further include one or more communication channels and/or links. The communication links may couple the one or more ICs to the memory, thereby enabling the one or more ICs to receive a computing instruction and/or data stored thereon required to perform a corresponding logical operation. The communication channels coupling the one or more ICs to the memory may include wired channels, such as one or more cables, fibers, wires, buses, and any other mechanically coupled communication channel. The communication channels may include wireless channels such as short, medium, and long-wave radio communication channels (e.g., Wi-Fi, BlueTooth, Zigbee, cellular, satellite), optical, and acoustic communication channels. The communications channels or links may include wires, cables, and/or fibers configured to transmit power (e.g., AC and/or DC power) generated by one or more fluid turbines. The communications channels or links may include communication links for transmitting electronic signals readable by at least one processor.

At least one processor may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

A processor may be configured to perform calculations and computations, such as arithmetic and/or logical operations to execute software instructions, control and run processes, and store, manipulate, and delete data from memory. An example of a processor may include a microprocessor manufactured by Intel™. A processor may include a single core or multiple core processors executing parallel processes simultaneously. It is appreciated that other types of processor arrangements could be implemented to provide the capabilities disclosed herein.

At least one processor may include a single processor or multiple processors communicatively linked to each other and capable of performing computations in a cooperative manner, such as to collectively perform a single task by dividing the task into subtasks and distributing the subtasks among the multiple processors, e.g., using a load balancer. In some embodiments, at least one processor may include multiple processors communicatively linked over a communications network (e.g., a local and/or remote communications network including wired and/or wireless communications links). The multiple linked processors may be configured to collectively perform computations in a distributed manner (e.g., as known in the art of distributed computing).

In some embodiments, at least one processor may include a plurality of processors configured to control a plurality of geographically-associated fluid turbines (e.g., a cluster of fluid turbines). In some embodiments, one or more fluid turbines in a cluster of fluid turbines may be associated with one or more specific processors, e.g., dedicated to a specific fluid turbine or a subset of specific fluid turbines in a cluster. In some embodiments, one or more processors may be configured in a central control unit to collectively control the operations of each fluid turbine in a cluster of fluid turbines. In some embodiments, at least one processor may include one or more processors dedicated to a specific fluid turbine in a cluster of fluid turbines, and one or more processors in a central control unit configured to control operations of the entire cluster of fluid turbines. In some embodiments, at least one processor may control operations of a plurality of geographically-associated fluid turbines to allow the plurality of geographically-associated fluid turbines to operate collectively as a single fluid energy conversion system.

A non-transitory computer-readable storage medium (e.g., a memory) refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located locally (e.g., in physical proximity to at least one processor and connected via a local communications link) or at a remote location (e.g., accessible to at least one processor via a communications network). Additionally, one or more computer-readable storage mediums can be utilized in implementing a computer-implemented method. Accordingly, the term computer-readable storage medium should be understood to include tangible items and exclude carrier waves and transient signals.

In some embodiments, a memory may include a plurality of memory storage devices configured to store information for controlling a plurality of geographically-associated fluid turbines (e.g., a cluster of fluid turbines). In some embodiments, one or more fluid turbines in a cluster of fluid turbines may be associated with one or more specific memory devices, e.g., dedicated to a specific fluid turbine or a subset of specific fluid turbines in a cluster. In some embodiments, one or more memory devices may be configured with a central control unit to collectively store information for controlling each fluid turbine in a cluster of fluid turbines. In some embodiments, a memory may include one or more memory devices dedicated to a specific fluid turbine in a cluster of fluid turbines, and one or more memory devices in a central control unit configured to store information for controlling the entire cluster of fluid turbines. In some embodiments, a memory may store information for controlling operations of a plurality of geographically-associated fluid turbines to allow the plurality of geographically-associated fluid turbines to operate collectively as a single fluid energy conversion system.

Consistent with the present disclosure, disclosed embodiments may involve a network. A network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Direct current (DC) (e.g., a DC power signal) may refer to a one-directional flow of electric charge. DC power may be used to operate a processor or controller. An example of DC power may include power produced by an electrochemical cell (e.g., a battery) or power stored in a capacitor. Electronic devices such as processors, controller, and memory devices may be operated using DC power.

Alternating current (AC) (e.g., an AC power signal) may refer to a bi-directional flow of electrical charge exhibiting a periodic change in direction. An AC current flow may change between positive and negative due to the positive or negative flow of electrons, producing a sinusoidal AC wave. An alternator may create AC power by positioning a conductive coil (e.g., copper windings) inside a fluctuating magnetic field. The fluctuating magnetic polarities may cause electric current in the conductive coil to change direction, producing an electrical waveform signal. AC power may travel farther than DC power without losing power, which may be advantageous for delivering power from power generating systems to consumers of electricity. An electric energy generator may generate AC power, and an electric power grid may supply AC power to consumers.

A three-phase voltage signal may refer to a voltage signal distributed as three voltage signals, each voltage signal at a phase shift of 120 degrees from the other voltage signals such that peaks and valleys of the three voltage signals do not align. The three voltage signals may be offset from each other by one-third of each cycle such that the waveform produced by each phase may be offset from one-third of a cycle produced by the other two phases. A three-phase voltage signal may allow for efficient stepping up and stepping down of high voltages for power transmission.

A load (e.g., an electrical load) may refer to an impedance or resistance. Such a load may be imposed on an electric energy generator (e.g., and a fluid turbine connected thereto) causing rotation of the electric energy generator and/or a fluid turbine connected thereto to slow. Generating a load may involve drawing away at least some electrical energy produced by an energy generator to an energy sink. Drawing away more electrical energy (e.g., increasing a load) may increase an impedance causing a rotational velocity of the fluid turbine to slow down. Drawing away less electrical energy (e.g., decreasing the load) may reduce an impedance cause a rotational velocity of the fluid turbine to increase.

A rectifier may refer to a device or circuitry that converts an alternating current (AC) to a direct current (DC) signal (e.g., an AC-to-DC converter). A rectifier may convert AC power (e.g., generated by an electric energy generator) to DC power (e.g., to power at least one processor). In some embodiments, each of the geographically-associated fluid turbines may be associated with a dedicated rectifier. The dedicated rectifiers for each fluid turbine may be housed in a separate housing (e.g., per fluid turbine), or in a common housing for multiple fluid turbines.

An inverter (e.g., a power inverter) may refer to a device or circuitry that converts a direct current (DC) signal to an AC signal (e.g., a DC-to-AC converter). An inverter may convert a DC signal to produce a square wave, a sine wave, a modified sine wave, a pulsed sine wave, a pulse width modulated wave (PWM) depending on the circuit design of the inverter. An inverter may convert DC power to AC power for transmitting to an electric power grid. In some embodiments, the plurality of geographically-associated fluid turbines may be associated with a single inverter for outputting collectively generated AC power to a power grid.

For instance, each AC power signal outputted by each geographically-associated fluid turbine may be converted to a DC power signal via each of the dedicated rectifiers. Circuitry (e.g., including at least one processor) may process the DC power signals to enable combining each of the DC power signals to form an aggregate DC power signal, such that converting the aggregate DC power signal via an inverter may produce an AC power signal that may be compatible for transmitting to an electric power grid.

A capacitor may refer to an electronic component configured to store electrostatic energy in an electric field by storing electric charge on two opposing surfaces (e.g., conducting plates) separated by an insulator (e.g., a dielectric medium). Applying an electric potential difference (e.g., a voltage) across the plates of a capacitor, may cause an electric field to develop across the dielectric medium, causing a net positive charge to accumulate on one plate and net negative charge to accumulate on the opposing plate, allowing for storage of electrical energy as a potential difference between the two plates. The plates of a capacitor may be connected to other circuit components (e.g., via contacts of the capacitor) allowing for integration of one or more capacitors into an electronic circuit. In some embodiments, a capacitor may function as a source of electrical energy (e.g., similar to a battery). However, a capacitor may be differentiated from a battery because a capacitor may lack a chemical reaction to receive, store and generate electrical energy. A capacitor may be manufacturable on a microelectronic scale for integration with other microelectronic components, e.g., in a photolithographic process.

A battery may refer to an electrical device configured to convert chemical energy into electrical energy or vice versa. A battery may include one or more cells, each cell containing electrodes and an electrolyte. When the electrodes are connected to an external circuit, a chemical reaction may occur in the electrolyte, creating a flow of electrons, which generates an electric current. The amount of electrical energy that can be stored in a battery may be determined by the capacity (e.g., measured in amp-hours, Ah, or milliampere-hours, mAh). Batteries may be rechargeable, or non-rechargeable.

A battery bank may include a plurality of batteries connected together in a series or parallel configuration to provide a larger capacity and/or higher voltage. A battery bank may be used to store electrical energy generated by a renewable energy source, such as a plurality of fluid turbines, e.g., for subsequent use by a consumer. In some embodiments, a battery bank may include multiple batteries connected in series to increase the voltage while maintaining a steady capacity. In some embodiments, a battery bank may include multiple batteries connected in parallel to increase capacity while maintaining a steady voltage. In some embodiments, a battery bank may include multiple batteries connected in series and in parallel to allow increasing voltage and capacity. A charge controller may be used to ensure that the batteries in a battery bank have a similar state of charge and similar electrical characteristics, e.g., to prevent overcharging, over-discharging, and/or uneven aging of one or more batteries included therein.

A DC-DC converter may include an electric power converter, for example, an electronic circuit and/or a device configured to convert a DC voltage signal from a first DC voltage level to a second voltage level. A DC-DC converter may reduce (e.g., buck) a DC voltage signal or increase (e.g., boost) a DC voltage signal. For instance, a DC-DC converter may store electrical energy temporarily and release the electrical energy at a different voltage. In some embodiments, a DC-DC converter may be designed to (e.g., substantially) maximize energy harvested from fluid turbines and/or photovoltaic cells (e.g., as a power optimizer). DC-DC converters may include electronic voltage converters (e.g., using one or more capacitors, inductors, and/or transformers), magnetic voltage converters (e.g., using an inductor and/or transformer to periodically release energy from a magnetic field stored therein), bi-directional DC-DC converters, and/or capacitive voltage converters.

A charge controller may refer to an electronic device configured to help ensure compliance of a fluid turbine with one or more regulations and/or specifications. For instance, a charge controller may prevent overcharging of a battery bank by a fluid turbine while limiting a rotational speed of the fluid turbine (e.g., when the battery bank is full and/or under high fluid speed conditions), and may allow aggregation of power from multiple fluid turbines without incurring loss due to interference. A charge controller may include an AC-to-DC converter (e.g., a rectifier), one or more of a voltage sensor switch, a voltage regulator (e.g., for regulating a DC voltage for supplying DC power to a battery bank), and/or a dump load (e.g., for diverting excess power to prevent overcharging). In some embodiments, a charge controller may include a user interface and/or features to protect against excessive voltage, current, and/or temperature. For example, the user interface may be associated one or more light emitting diodes or LEDs (e.g., to emit warning lights), speakers (e.g., to emit warning sounds), an electronic screen, and/or any other interface that may allow a user to interact with the charge controller.

A charge controller may be connected to an AC output of an electric energy generator connected to a fluid turbine. The AC-to-DC converter of the charge controller may convert the AC output to a DC signal (e.g., for aggregating with other DC signals produced by other charge controllers associated with other fluid turbines without incurring lossy interference). At least one voltage sensor switch of the charge controller may transmit the DC signal to charge the battery bank when the DC voltage level is below an upper limit for the battery bank, and may divert the DC signal (e.g., excess DC power) to the dump load when the DC voltage level exceeds the upper limit. The voltage regulator may regulate the DC voltage transmitted to the battery bank to comply with one or more specification, regulations, and/or recommendations associated with the battery bank.

An aggregate power signal may refer to a power signal produced by combining multiple electrical power signals originating from different power sources (e.g., energy generators) into a single, merged power signal. Aggregating power signals may require synchronizing the energy generators (e.g., synchronizing the frequency, the phase angle, and/or adjusting the voltage levels to reach a matched voltage level), and/or storing electrical energy of one or more power signals temporarily (e.g., in one or more capacitors and/or batteries). Once the power signals from each energy generator are synchronized and matched, the power signals may be combined using electrical devices such as power combiners or power distribution panels. The combined (e.g., aggregate) signal may be transmitted to an electrical grid or used to power a load.

An electrical grid (e.g., a power grid) may include an interconnected network delivering electric power (e.g., AC power) from a single or plurality of energy generators to a single or plurality of consumers. An electrical grid may be designed to supply electricity at a substantially steady voltage level under varying electrical power demand (e.g., by electrical energy sinks) and supply by (e.g., by energy generators). An electrical grid may use one or more tap changers or transformers to adjust a voltage and cause the voltage to remain within electrical grid specification. Attributes of power supplied to an electrical grid (e.g., frequency, phase, power level) by one or more energy generators may be required to comply with regulations or standards.

A signal may refer to information encoded for transmission via a physical medium. Examples of signals may include signals in the electromagnetic radiation spectrum (e.g., AM or FM radio, Wi-Fi, Bluetooth, radar, visible light, lidar, IR, Zigbee, Z-wave, and/or GPS signals), sound or ultrasonic signals, electrical signals (e.g., voltage, current, or electrical charge signals), electronic signals (e.g., as digital data), tactile signals (e.g., touch), and/or any other type of information encoded for transmission between two entities via a physical medium.

A detector may refer to a device that outputs an electronic signal in response to detecting, sensing, or measuring a physical phenomenon. A detector may convert a measurement of a physical phenomenon to a medium (e.g., an electronic medium) for receiving by at least one processor. A detector may include one or more of a mechanical sensor, an optical sensor, a resistive sensor, a capacitive sensor, a temperature sensor, a piezoelectric sensor, a Hall sensor, a thermocouple sensor, photoelectric sensor, a digital position sensor, a current sensor, a voltage sensor, a photoelectric encoder, a pressure sensor, a fluid (e.g., liquid) level sensors, a flow sensor, and/or any other type of sensor that may be used to detect position, linear displacement, pressure, temperature, flow, vibrations, rotational velocity, current, voltage, power, and/or any other parameter associated with, e.g., generation of electrical energy.

A controller (e.g., a charge controller) may enable maximum energy extraction by adjusting a shaft speed (e.g., corresponding to a rotational speed) of a fluid turbine in response to varying fluid speeds. The controller may adjust the shaft speed by sending an electrical signal to the copper windings of a generator rotor coupled thereto. The electrical signal may introduce an impedance (e.g., by shunting or shorting the copper windings) causing a rotational speed of the rotor to slow down, and causing a corresponding slowing of the fluid turbine coupled thereto for producing maximum power under varying fluid conditions. A charge controller may adjust a shaft speed by increasing or decreasing a load on an energy generator connected thereto.

A brake may refer to a device configured to adjust (e.g., slow) a rotational speed of a fluid turbine and/or an energy generator connected thereto. A brake may include a mechanical brake and/or an electronic brake. A mechanical brake may include one or more brake pads, disks, and/or drums, e.g., activated via a switch. In some embodiments, a mechanical brake may include a lock, such as a pin configured to engage and hold a brake. An electronic brake may include a switch configured to introduce and/or remove a load (e.g., a dump load) imposed on a fluid turbine.

Figure 1B:
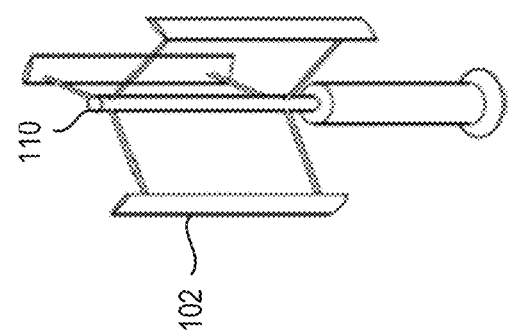
Figure 1A:
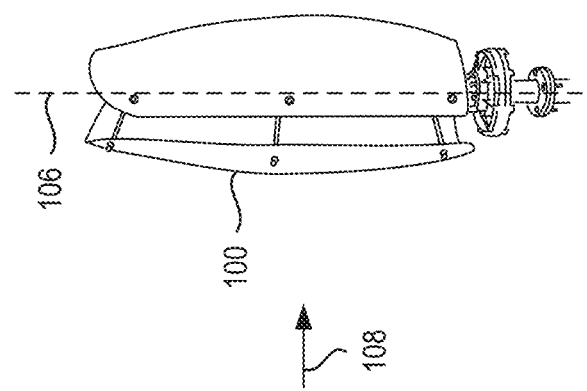

Reference is made to FIGS. 1A-1C, which illustrate a variety of exemplary vertically-oriented fluid turbines 100, 102, and 104, each of which is consistent with some embodiments of the present disclosure. Fluid turbine 100 may be an exemplary vertical wind turbine, having an axis of rotation 106 positioned generally perpendicular to the direction 108 of a fluid flow. Fluid turbine 102 may be an exemplary H-type lift vertical wind turbine rotatable about a vertically-oriented shaft 110, and fluid turbine 104 may be an exemplary Helix (e.g., vertical) wind turbine rotatable about a vertically-oriented shaft 112. It is to be noted that exemplary fluid turbines 100 to 112 are shown for illustrative purposes and are not intended to limit the disclosure to any particular type or implementation of a fluid turbine because inventive principles described herein may be applied to any turbine or turbine cluster, regardless of structure or arrangement. Moreover, while some non-limiting examples may refer to any one of fluid turbines 100-112, these examples are provided for conceptual purposes only and do not limit the disclosure to any particular implementation or type of fluid turbine.

Figure 2:
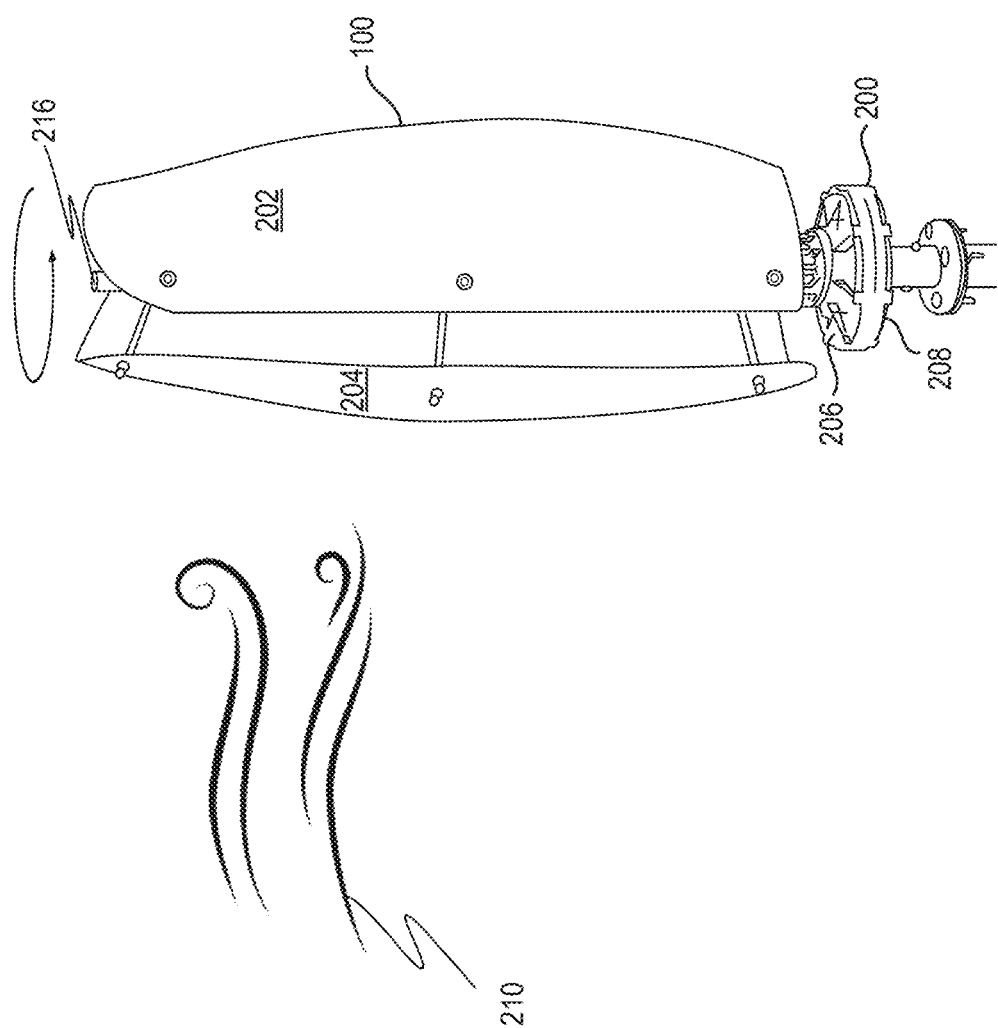
FIG. 2 is a view of an exemplary fluid energy conversion system including a fluid turbine coupled to an energy generator, consistent with some embodiments of the present disclosure.

FIG. 2 is a view of an exemplary fluid energy conversion system including fluid turbine 100 of FIG. 1A, coupled to an energy generator 200, consistent with some embodiments of the present disclosure. Fluid turbine 100 may include a plurality of blades 202 and 204 configured to spin in response to a fluid flow 208. Energy generator 200 may include a rotor 206 and a stator 208, together housing one or more permanent magnets and copper windings (e.g., the rotor may include the magnets and the stator may include the copper windings, or the reverse). Energy generator 200 may be configured to induce an alternating current (AC) when rotor 206 rotates relative to stator 208 (e.g., by generating a fluctuating magnetic field to surround the copper windings from the rotational motion). Kinetic energy contained in fluid flow 210 may exert a force on fluid turbine 100 causing blades 202 and 204 to rotate. The rotational motion of blades 202 and 204 may cause rotor 206 of energy generator 200 to spin relative to stator 208, generating an alternating current, thereby converting the kinetic energy of fluid flow 210 to electrical energy.

Figure 3:
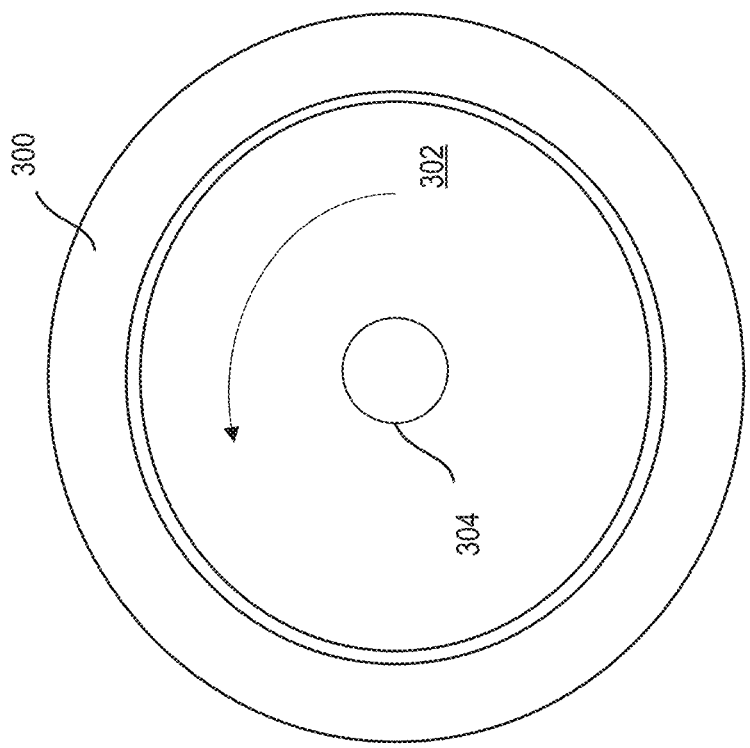
FIG. 3 is an exemplary top view of a fluid energy conversion system including an outer stator and an inner rotor, consistent with some embodiments of the present disclosure.

FIG. 3 illustrates an exemplary top view of a fluid energy conversion system including an outer stator 300 and an inner rotor 302, consistent with some embodiments of the present disclosure. Inner rotor 302 may be mechanically coupled to a rotatable shaft 304 of a fluid turbine. Inner rotor 302 may include one or more permanent magnets and outer stator 300 may include copper windings, such that when inner rotor 302 rotates due to a rotation of a shaft of a fluid turbine connected thereto, copper windings of outer stator 300 may be exposed to a fluctuating magnetic field, thereby inducing an AC signal.

Figure 4:
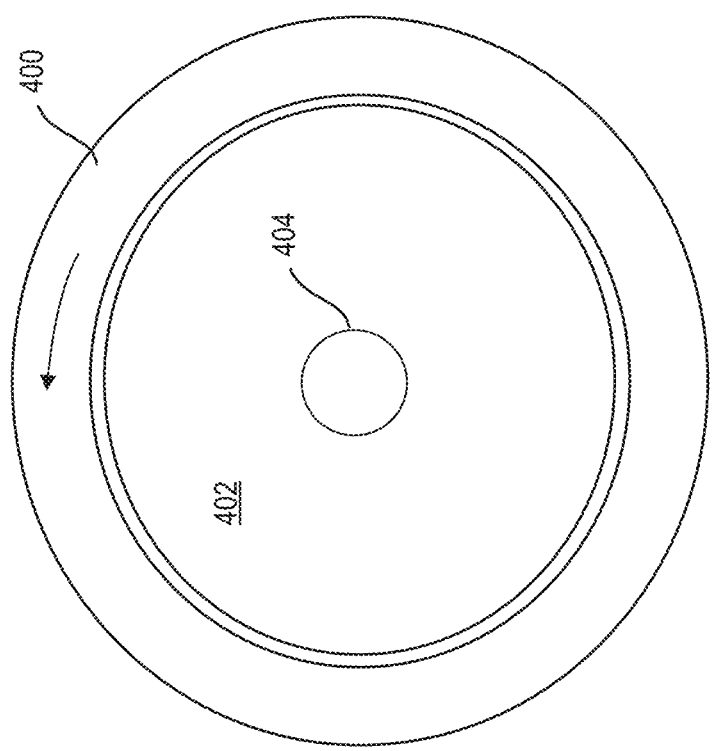
FIG. 4 exemplary top view of a fluid energy conversion system including an outer rotor and an inner stator, consistent with some embodiments of the present disclosure.

FIG. 4 illustrates an exemplary top view of a fluid energy conversion system including an outer rotor 400 and an inner stator 402, consistent with some embodiments of the present disclosure. Outer rotor 400 may be mechanically coupled to a rotatable shaft 404 of a fluid turbine. Outer rotor 400 may include one or more permanent magnets and inner stator 402 may include copper windings, such that when outer rotor 400 rotates due to a rotation of shaft 404 connected thereto, copper windings of inner stator 402 may be exposed to a fluctuating magnetic field, thereby inducing an AC signal.

Figure 5:
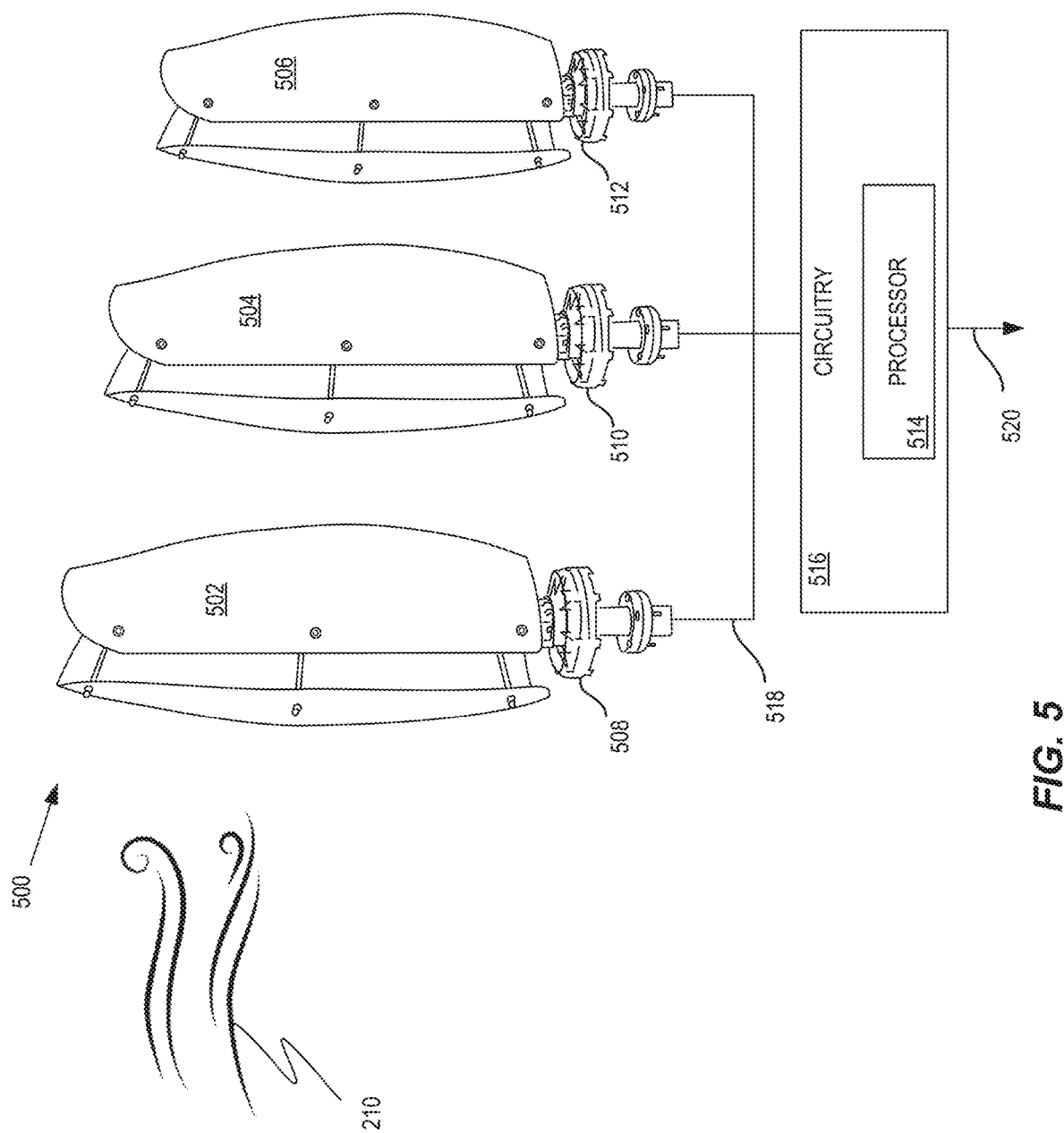
FIG. 5 is a view of an exemplary cluster of geographically associated fluid turbines, consistent with some embodiments of the present disclosure.

FIG. 5 illustrates a view of an exemplary cluster 500 of geographically associated fluid turbines 502, 504, and 506 and associated generators 508, 510, and 512, respectively, consistent with some embodiments of the present disclosure. Geographically associated fluid turbines 502, 504, and 506 and associated generators 508, 510, and 512 may be connected to at least one processor 514 via circuitry 516 and one or more communication links 518. Communication links 518 may include differing types of wired communication links (e.g., wires, cables, fibers) and/or wireless communication links (e.g., Wi-Fi, BlueTooth, Zigbee, AM, FM, PM radio transceivers, satellite or GPS transceivers, IR transceivers, ultrasound transceivers, and/or any other type of wireless communications links). Communications links 518 may include high power communication links, e.g., for receiving electric power generated by associated generators 508, 510, and 512, and/or for sending a load-bearing signal to fluid turbines 502, 504, and 506, and/or associated generators 508, 510, and 512. Communications links 518 may additionally include lower power communication links, e.g., for sending and receiving data between a plurality of processors and/or sensors.

At least one processor 514 may be configured to control each of fluid turbines 502, 504, and 506 separately or coordinate operation of each of fluid turbines 502, 504, and 506. For example, at least one processor 514 may coordinate operations such as braking, slowing, stopping, locking, unlocking, and/or starting one or more of fluid turbines 502, 504, and 506. As another example, at least one processor 514 may control a rotational direction and/or speed for any of fluid turbines 502, 504, and 506, implement an MPPT protocol for one or more of fluid turbines 502, 504, and 506, control a relative rotational phase between any of fluid turbines 502, 504, and 506, and/or perform any other procedure to coordinate operations for one or more of fluid turbines 502, 504, and 506. At least one processor 508 may include one or more individual processors, each dedicated to control one of fluid turbines 502, 504, and 506, and/or one or more processors dedicated to control fluid turbines 502, 504, and 506 collectively as cluster 500, operating as a single integral energy conversion system. While cluster 500 is shown having three fluid turbines, this is for illustrative purposes only, and cluster 500 may include as few as two fluid turbines, or more than three fluid turbines. Circuitry 516 may aggregate power generated by each of fluid turbines 502, 504, and 506 and associated generators 508, 510, and 512 to produce to total power output 520. It bears repeating that although the discussion of FIG. 5 occurs in connection with the example turbine structures illustrated, the principles described in FIG. 5 apply to any turbine, regardless of turbine structure. For example, the discussion of FIG. 5 may be relevant to horizontal-axis fluid turbines, water turbines, gas turbines, wind turbines, and/or any other type of fluid turbines and/or combinations thereof.

Figure 6:
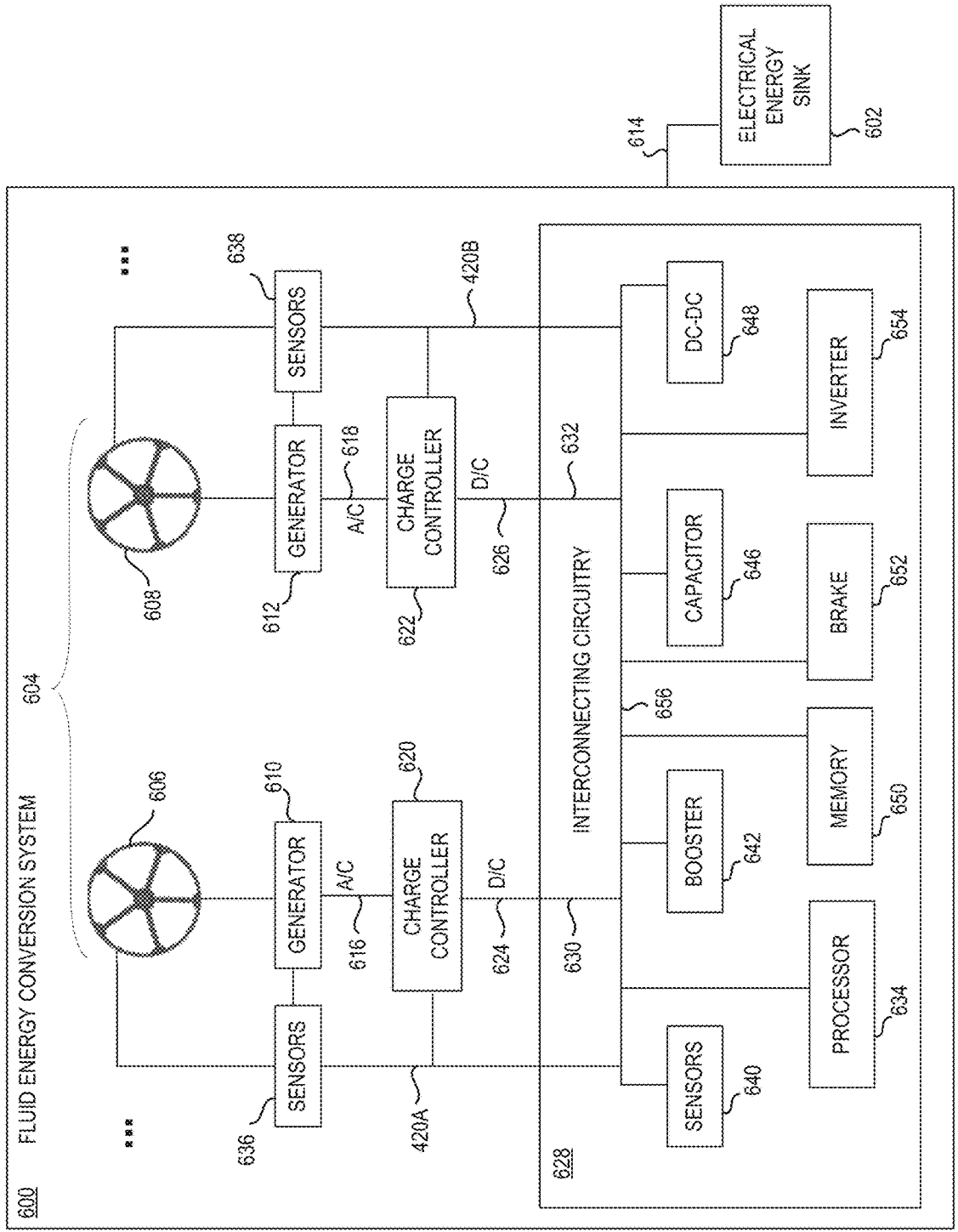
FIG. 6 is a schematic diagram of an exemplary fluid energy conversion system configured to generate electric power from a fluid flow and output the generated electric power to an energy sink, consistent with some embodiments of the present disclosure.

FIG. 6 illustrates a schematic diagram of an exemplary fluid energy conversion system 600 configured to generate electric power from a fluid flow and output the generated power to an energy sink 602, consistent with some embodiments of the present disclosure. Fluid energy conversion system 600 may include a plurality (e.g., a cluster) 604 of geographically-associated fluid turbines 606 and 608. Each of fluid turbines 606 and 608 may be connected to energy generators 610 and 612, respectively, for converting energy in a fluid flow (e.g., fluid flow 210 shown in FIG. 2) to electric power (e.g., a total electric power output 614) for at least one energy sink 602 (e.g., a load). Total electrical power output 614 may include a DC power output, e.g., for powering a battery bank, or an AC power output, e.g., for delivery to an electric grid. In some embodiments, a portion of total electrical power output 614 may be delivered as a DC signal to charge one or more batteries, and a portion of total electrical power output 614 may be delivered as an AC signal to an electrical grid. In some embodiments, a portion of total electrical power output 614 may be delivered as DC electrical energy to power circuitry for controlling one or more elements of fluid energy conversion system 600, such as control circuitry associated with fluid turbines 606 and 608 and/or energy generators 610 and 612. Fluid turbines 606 and 608 may be any fluid turbine, including but not limited to the various exemplary turbines illustrated in FIG. 1. Examples of an energy sink may include an electric power grid, one or more batteries, and/or any other sink for electric power. Energy generators 610 and 612 may convert mechanical rotational energy received from fluid turbines 606 and 608 to a plurality of AC power outputs 616 and 618. Fluid turbines 606 and 608 and electric energy generators 610 and 614 may be each associated with charge controllers 620 and 622, respectively. AC power outputs 616 and 618 may be converted to DC signals 624 and 626 via charge controllers 620 and 622, respectively. Charge controllers 620 and 622 may include electronic circuitry such as one or more of a rectifier (e.g., an AC-to-DC converter), a voltage sensor switch, a dump load, a braking circuit, a capacitor, and/or a voltage booster. DC signals 624 and 626 may be conveyed to interconnecting circuitry 628 via a plurality of links 630 and 632. Links 630 and 632 may include one or more of coaxial cables, fiber, and/or wires configured to transmit power signals.

Charge controllers 620 and 622 may transmit one or more electronic signals to interconnecting circuitry 628 via communications links 630 and 632, respectively. Communications links 630 and 632 may include one or more wired and/or wireless communication channels configured to transmit and receive electronic signals between at least one processor 634 and charge controllers 620 and 622.

Each of fluid turbines 606 and 608 and associated generators 610 and 612 may be associated with at least one sensor 636 and 638, described in greater detail below. Sensors 636 and 638 may connect to fluid turbines 606 and 608 and/or associated generators 610 and 612 to sense one or more operational parameters associated therewith, and transmit the one or more sensed operational parameters to charge controllers 620 and 622, respectively.

Interconnecting circuitry 628 may include at least one sensor 640, at least one booster (e.g. voltage boosters) 642, at least one capacitor 646, at least one DC-DC converter 648, at least one processor 634, at least one memory 650, at least one brake circuit 652, and/or at least one inverter 654, interconnected via a communications link 656. In some embodiments, inverter 654 may be a single inverter configure to convert aggregated DC power produced by cluster 604 to a grid-compatible AC signal (e.g., 110V, 120V, 220V, 240V, or any other voltage level compatible with a regional electric power grid). One non-limiting example of an inverter that may be employed is an IQ7 Plus manufactured by Enphase Energy, Inc. of Fremont California.

Figure 7:
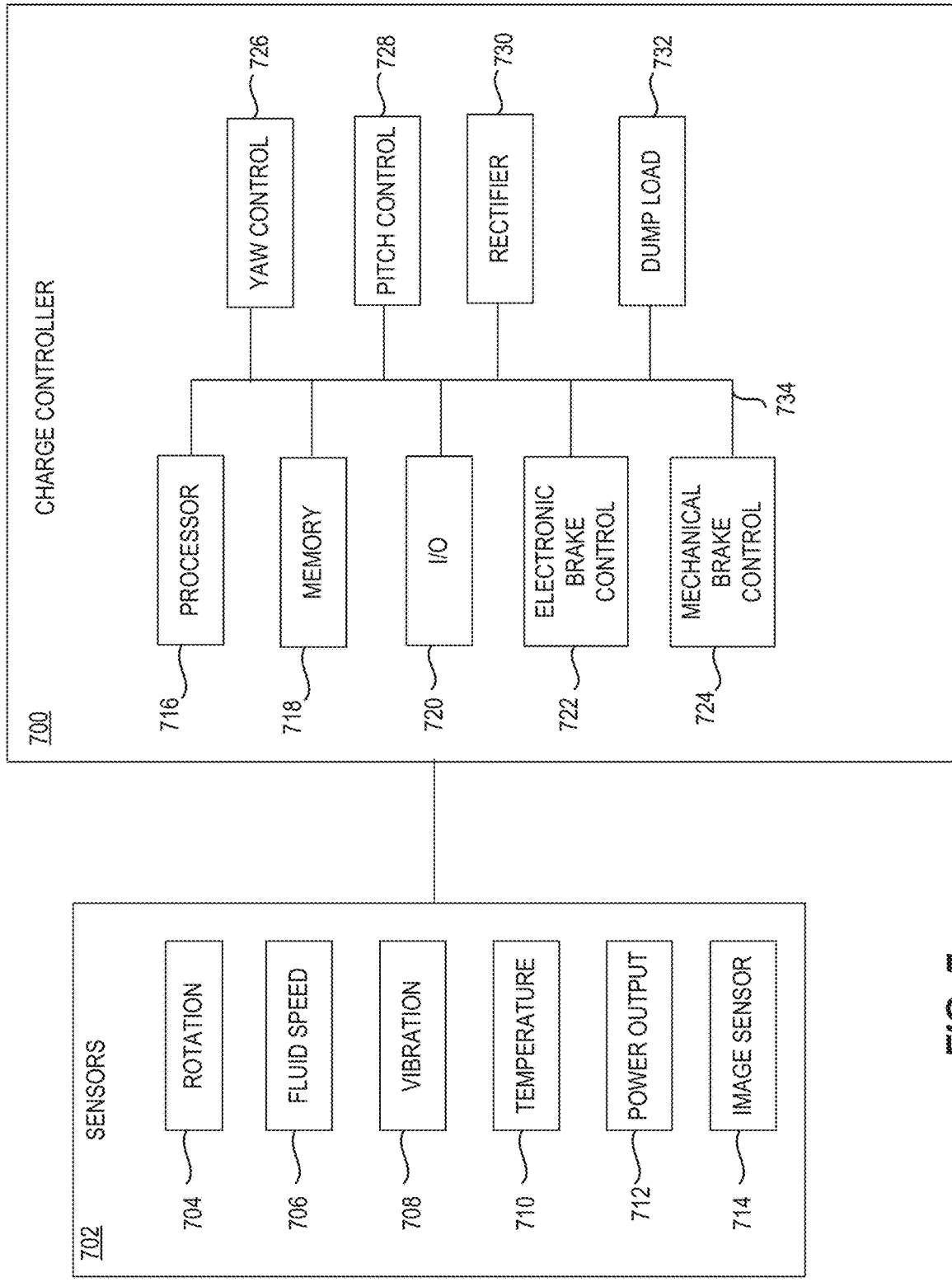
FIG. 7 is an exemplary schematic diagram of a charge controller connected to at least one sensor, consistent with some embodiments of the present disclosure.

FIG. 7 illustrates an exemplary schematic diagram of a charge controller 700 connected to at least one sensor 702, consistent with some embodiments of the present disclosure. For example, charge controller 700 may correspond to any of charge controllers 620 and 622, and at least one sensor may correspond to any of at least one sensors 636 and 638 of FIG. 6. For instance, charge controller may be connected to any of fluid turbines 606 and 608 and/or associated generators 610 and 612.

At least one sensor 702 may include one or more rotation sensors 704, fluid speed sensors 706, vibration sensors 708, temperature sensors 710, power output sensors 712, and/or image sensors 714. The one or more rotation sensors 704 may be associated with a rotating component of a fluid turbines and/or an associated generator. For instance, one or more rotation sensors 704 may be associated with one or more turbine blades, a rotatable shaft, and/or a rotor. Fluid speed sensor 704 may be configured to sense a speed of a fluid flow affecting a fluid turbine. Examples of fluid speed sensor 704 may include one or more of an anemometer, a water current sensor, a gas flow meter, and/or a steam flow meter for sensing. Vibration sensor 706 may include as examples one or more accelerometers, piezoelectric, piezoresistive, and/or capacitive MEMS for sensing vibrations of one or more components of a fluid turbine and/or an associated generator. Temperature sensor 708 may include, for example, a thermometer, a thermostat, a thermocouple, a thermopile, an infrared thermometer, a bimetallic strip thermometer, or any other type of temperature measurement device. Power output sensor 710 may include, for example, a voltmeter (e.g., a voltage sensor) and/or a current meter (e.g., a current sensor) for measuring power generated by a generator associated with a fluid turbine. One or more image sensors 714 may include one or more cameras (e.g., a charged coupled device or CCD camera, and/or a CMOS camera for detecting visible light and/or an IR camera).

Charge controller 700 may include one or more of at least one processor 716, a memory 718, a device for input/output (I/O) 720 (e.g., for communicating with at least one processor 428 via communications link 420), an electronic brake control 722, a mechanical brake control 724, a yaw control 726, a pitch control 728, a rectifier 730, and/or a dump load 732. At least one processor 716, memory 718, I/O 720, electronic brake control 722, mechanical brake control 724, yaw control 726, pitch control 728, rectifier 730, and/or dump load 732 may be interconnected via bus system 734. In some embodiments, a clock (e.g., of at least one processor) may be used as a sensor, e.g., to schedule a maintenance or safety procedure, and/or to synchronize operation of a fluid turbine. In some embodiments, a clock may be used in conjunction with scheduling software to issue alerts (e.g., signals) to invoke braking, slowing, stopping, locking, and/or unlocking of a fluid turbine by at least one processor.

Electronic brake control 722 may include an inverter and a booster, e.g., to implement an electronic braking mechanism. For example, electronic braking of a fluid turbine may be implemented by imposing a load (e.g., impedance) on an associated generator. In some embodiments, electronic braking may be implemented with an AC signal. At least one processor (e.g., at least one processor 634 and/or processor 716) may determine an AC signal configured to impose a specific load to achieve a desired level of braking, e.g., by causing interference with another AC signal. In some embodiments, electronic braking may be implemented with a DC signal, e.g., to cause a switch to divert a power output of a generator to a dump load. The at least one processor may transmit a DC signal to electronic brake control 722 of charge controller 700. Electronic brake control 722 may use the DC signal to produce an AC signal, which may be boosted by electronic brake control 722 to a level for imposing a specific load on the associated generator. For example, the AC signal may be used to implement an MPPT protocol, engage an electronic brake, adjust a phase of a fluid turbine (e.g., by slowing one fluid turbine relative to another fluid turbine), adjust a rotational speed, adjust a rotational direction, and/or to perform any other controlling operation on a fluid turbine.

Mechanical brake control 724 may include one or more electronic switches allowing at least one processor to control one or more mechanical brakes (e.g. brake pads, disks, and/or drums) configured with one or more rotating components of a fluid turbine and/or an associated generator.

In some embodiments, electronic braking of fluid turbines may be implemented by charge controllers which may divert power, produced by associated generators, to a dump load. In some embodiments, a plurality of charge controllers connected to a plurality of fluid turbines and associated generators may coordinate rotational speeds thereof by diverting generated power to a single, common dump load.

In some embodiments, transmitting electricity generated by a cluster of fluid turbines placed in relative proximity over moderate to large distances may result in energy loss due to power transmission at low voltages. For example, transmitting low voltage electricity from a 48-volt generator over long distances to an inverter may result in substantial electrical losses. In some embodiments, one or more inverters and/or rectifying systems may be located in proximity (e.g. underneath and/or adjacent) to the turbines and associated generators in a cluster, e.g., to reduce energy loss. The inverters, which may output higher voltage than typical generators, may be interconnected using a single cable to enable transmission of higher voltages and reduce loss. Thus, in some embodiments, each fluid turbine in a cluster may have an inverter in proximity thereto, to allow generating high voltages to reduce loss.

However, transmitting electricity from closely clustered fluid turbines using a different cable dedicated to each fluid turbine may be costly. In some embodiments, a plurality of inverters associated with a cluster of fluid turbines may be connected together in a single cable for transmission to a common destination. The electricity may be converted at the destination to DC if necessary. In some embodiments, the electricity may be transmitted via a junction box placed in proximity to the cluster of fluid turbines.

As an example, low voltage outputs from a wind turbine (e.g., less than 48, 60, 72, 84, 96, 108, or 120 volts) may be fed to a nearby rectifier system. An aggregate DC voltage may be fed to a nearby inverter producing at least 110 volts and/or to multiple inverters spliced together in parallel as a single cable that may transmit power to a destination. Thus, use of a single large cable with separate wires connected to each turbine in a cluster may result in less loss of electricity.

Some disclosed embodiments involve a vertically-orientable shaft having at least one opening extending transversely therethrough. A vertically-orientable shaft refers to a shaft that is configured for being positioned and/or aligned in a pose that is upright, standing, and/or substantially perpendicular to the ground. A vertically-orientable shaft may be a shaft (as described and exemplified elsewhere herein) configured for orientation in a substantially vertical arrangement. In some embodiments, a vertically-orientable shaft may be hollow. An opening extending therethrough refers to an orifice, hole, and/or aperture penetrating and/or passing through an object. For example, an opening extending through an object may form a channel and/or passage through the object. In some embodiments, the opening may extend completely through the object. Transverse refers to extending through in a manner non-parallel to a length of the shaft. For example, transverse may refer to an orthogonal or non-orthogonal orientation relative to the length of the shaft. An opening extending transversely through a shaft may expose two holes on either side of the shaft. If the shaft is a cylindrical shaft, two holes may be exposed on opposite sides of the cylindrical wall of the shaft. For instance, the two holes may be at substantially the same level, such that a channel formed by the opening may be substantially perpendicular to the shaft. A vertically-orientable shaft having at least one opening extending transversely therethrough may refer to a shaft including an orifice and/or hole passing through the shaft to form a channel or a pathway such that when the shaft is positioned in a vertical alignment, the channel may cross through the shaft along an axis that cross an axis of the shaft. Such an axis may be horizontal, for example, relative to the shaft.

Figure 8:
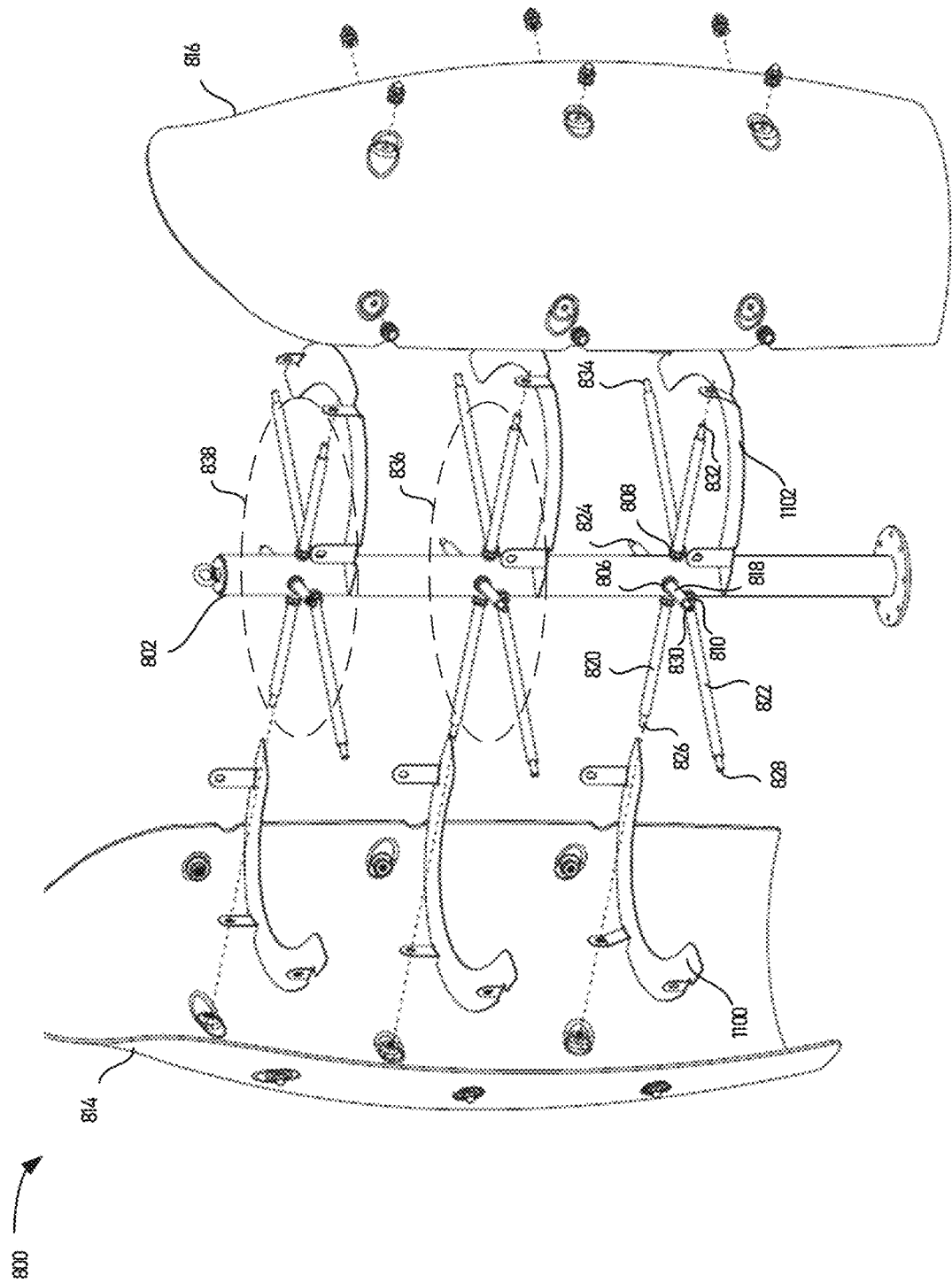
FIG. 8 is an exemplary exploded view of a vertically-oriented fluid turbine, consistent with some embodiments of the present disclosure.

By way of a non-limiting example, reference is made to FIG. 8, which is an exemplary exploded view of a vertically-oriented fluid turbine 800. Fluid turbine 800 may include a vertically-orientable shaft 802 having at least one rod 818 extending through at least one shaft opening 806 via at least one sleeve, consistent with some embodiments of the present disclosure. At least one opening 806 may extend transversely through vertically-orientable shaft 802.

Figure 9:
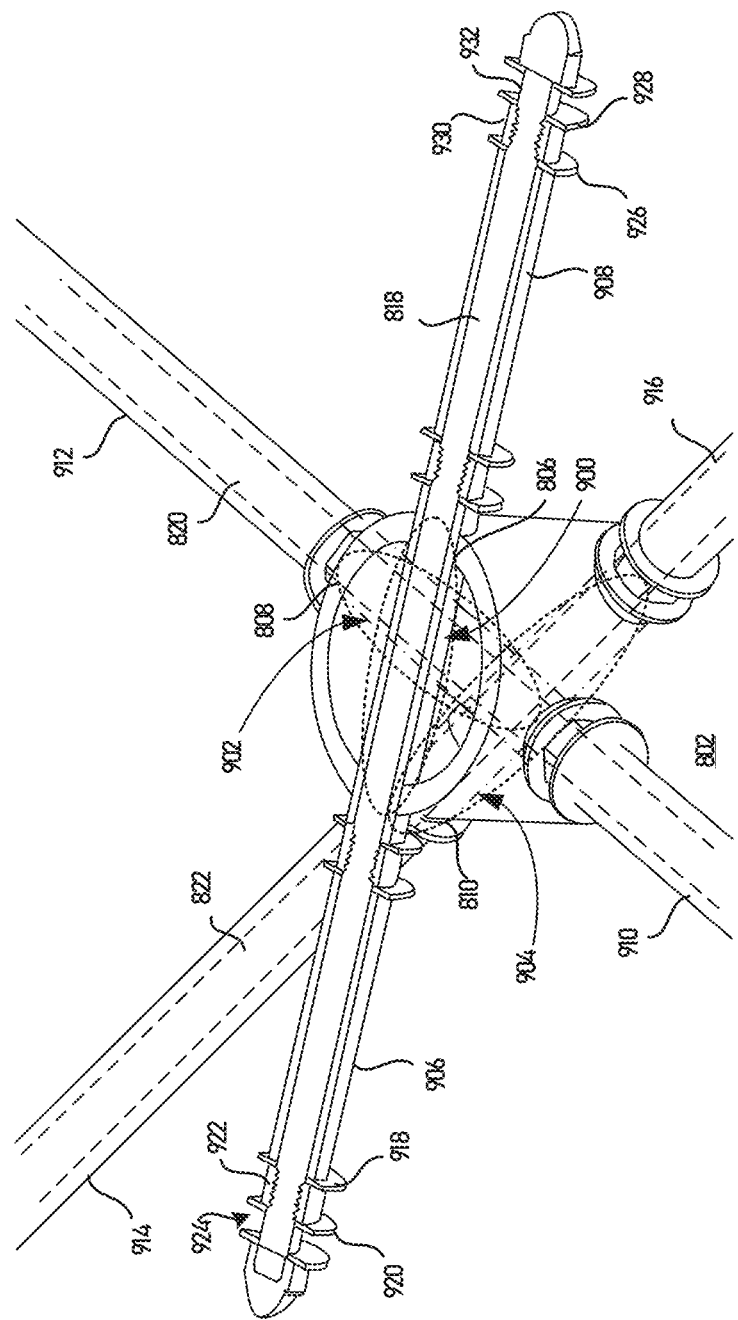
FIG. 9 is an exemplary schematic cross-sectional view of the vertically-orientable turbine shaft of FIG. 8, consistent with some embodiments of the present disclosure.

By way of another non-limiting example, reference is made to FIG. 9, which is an exemplary schematic cross-sectional view of vertically-orientable turbine shaft 802 of FIG. 8, consistent with some embodiments of the present disclosure. Vertically-orientable shaft 802 includes at least three openings 806, 808, and 810, extending transversely therethrough.

Some disclosed embodiments involve a first blade portion, configured for vertical orientation on first side of the shaft; a second blade portion, configured for vertical orientation on second side of the shaft, opposite the first side. A blade portion refers to a part and/or section of a turbine blade, which may be understood as described and exemplified elsewhere herein. "First" and "second" refer to differing portions which may be either connected or disconnected from each other. For instance a first blade portion and a second blade portion may refer to two distinct blade portions. In some disclosed embodiments, the first and second blade portions may be connected. For instance, the first and second blade portions may be different portions of a single blade. As an example, a turbine blade may have a curved (e.g., semi-circular) shape forming an arc at least partially surrounding a turbine shaft, and the first and second blade portions may sweep different section of the arc. Additionally or alternatively, first and second blade portions may refer to upper and lower sections of a blade or blades. In some disclosed embodiments, the first blade portion is a separate element from the second blade portion. A separate element refers to a distinct unit, not directly connected to another unit. For example, there may be a distinction or division between the first and second blade portions in the system or structure. For instance, a fluid turbine may include at least two distinct blades rotatable around a shaft. A first one of the at least two blades may include the first blade portion, and a second one of the at least two blades may include the second blade portion.

A side of a shaft refers to an orientation relative to a surface of a wall of the shaft. For example, a cylindrical shaft may present a plurality of perspectives from differing angles around the shaft. A particular perspective may correspond to a (e.g., first) side of the shaft. A first blade portion configured for vertical orientation on a side of a shaft refers to a first blade portion that may be aligned in an upright direction relative to an upright shaft and located on one (e.g., a first) side of the shaft. For example, the first blade portion may form a first arc partially surrounding a shaft on one side. Opposite refers to opposing, mirrored, reverse, and/or in a contrary direction. A second side of the shaft, opposite the first side refers to an orientation relative to a surface of a wall of the shaft that differs from the first side of the shaft. For example, if a shaft presents a first side, rotating the shaft (e.g., by 180° or any other angle) may present a second side of the shaft, opposite the first side. A second blade portion, configured for vertical orientation on second side of the shaft, opposite the first side refers to a second blade portion that may be aligned in an upright direction relative to an upright shaft and located on another (e.g., second) side of the shaft. In some embodiments, the second blade orientation may mirror blade orientation on the first side of the shaft. In other embodiments, the two blade portions may not mirror each other. For example, the second blade portion may form a second arc partially surrounding a shaft on another (e.g., a second) side of the shaft such that the first and second blade portions face each other.

By way of a non-limiting example, in FIG. 8, vertically-oriented fluid turbine 800 includes first and second blade portions 814 and 816, respectively, configured for vertical orientation on opposite sides of shaft 802. First blade portion 814 may be configured for vertical orientation on a first side of shaft 802, and second blade portion 816 may be configured for vertical orientation on a second side of shaft 802, opposite the first side. In some embodiments, first blade portion 814 may be a separate element from second blade portion 816. In some embodiments, first and second blade portions 814 and 816 may be made of plastic, fiberglass, acrylic, or any other lightweight malleable material, and shaft 802 may be made of metal, such as steel.

Some disclosed embodiments involve at least one rod extending through the at least one shaft opening. A rod refers to a bar, a pole, and/or any other thin, elongated straight element. In some embodiments, the bar may be made of metal and may have a round cross-section. Extending through refers to protruding, passing, jutting, and/or poking out of something. A rod extending through a shaft opening refers to a bar passing through a shaft via an aperture penetrating through both sides of the shaft. For example, a middle section of a bar may be located inside the shaft, with one end of the bar poking out of the shaft from an opening on one side of the shaft (or positioned at the opening on one side), and the other end of the bar poking out of the shaft from another opening on the opposite side of the shaft (or positioned at the opening on the opposite side).

In some disclosed embodiments, the at least one rod is connectable at a first end thereof to the first blade portion, and at a second end thereof to the second blade portion. Connectable refers to capable of being attached to something. For example, two objects may be connectable using one or more complementary components configured to engage with each other to thereby attach the two objects together. Some examples of complementary components configured to connect two objects together may include a bolt or screw with a nut, a hook and loop, and/or a pair of hooks. An end (of a rod) refers to a tip and/or furthermost section of a rod. At least one rod connectable at an end thereof to a blade portion refers to a tip of a rod attachable to a blade portion. For example, a tip of a rod may be associated with one or more bolts and/or nuts for connecting the tip to a blade portion. A rod connectable at a first end thereof to a first blade portion, and at a second end thereof to a second blade portion refers to a rod attachable, at one tip of the rod, to the first blade portion and attachable, at the other tip of the rod, to the second blade portion. For example, a rod may pass through an opening in a turbine shaft such that a middle section of the rod may be inside the shaft, with one end of the bar poking out on one side of the shaft for connecting to a first blade portion and the other end of the bar poking out of the opposite side of the shaft for connecting to the second blade portion.

By way of a non-limiting example, in FIG. 8, rods 818 and 820 may extend through shaft openings 806 and 808, respectively. Similarly, in FIG. 9, rods 818, 820, and 822 may extend through shaft openings 806, 808, and 810, respectively. Rods 818, 820, and 822 may connect at first ends thereof 824, 826, and 828 to first blade portion 814, and at second ends thereof 830, 832, and 834 to second blade portion 816. In some embodiments, rods 818, 820, and 822 may be made of metal, such as steel.

Some disclosed embodiments involve at least one reinforcing sleeve extending through the at least one shaft opening. Reinforcing refers to strengthening, supporting, and/or buttressing. For example, a reinforced object may be capable of withstanding more stress than an object lacking reinforcement because the reinforcement may offset and/or absorb at least some of the stress. Consequently, a reinforced object may be hardier, more resilient, and/or less prone to warping and/or damage than an object lacking reinforcement. A sleeve refers to an object capable of enclosing and/or surrounding another object. For example, a sleeve may include a sheath, a tube, and/or an encasement. A reinforcing sleeve refers to a sleeve configured to strengthen, support, and/or buttress. It may refer to a tube and/or encasement capable of withstanding and/or absorbing stress to thereby offset at least some stress from an object protected by the sleeve. A reinforcing sleeve extending through a shaft opening refers to a strengthening tube and/or encasement protruding from an orifice of a shaft. In some embodiments, a first reinforcing sleeve may protrude from an orifice in a first side of a shaft and a second reinforcing sleeve may protrude from an orifice in a second side of the shaft. In some embodiments, a reinforcing sleeve extending through a shaft opening may refer to a reinforcing sleeve passing through a shaft via an aperture penetrating through both sides of the shaft to form a channel through the shaft. For example, a middle section of a reinforcing sleeve may be located inside the shaft, with one end of the reinforcing sleeve poking out of the shaft from an opening on one side of the shaft, and the other end of the reinforcing sleeve poking out of the shaft from another opening on the opposite side of the shaft.

In some disclosed embodiments, the at least one reinforcing sleeve is bonded to the shaft. Bonded refers to glued and/or fastened using an adhesive. For example, a metal object may be attached to another metal object using a metal-to-metal adhesive. Such adhesives may include, for example, epoxy, acrylic metal glue, cyanoacrylate, and/or anaerobic metal adhesives. Thus, the at least one reinforcing sleeve may be at least partially attached to a turbine shaft using a metal-to-metal adhesive. In some disclosed embodiments, the at least one reinforcing sleeve is welded to the shaft. Welding refers to a fabrication process whereby intense heat may be applied to melt at least a portion of a metal object (e.g., a base metal), causing a plurality of metal objects to fuse together. In some instances, in addition to melting a base metal of at least one metal object, welding may introduce a filler material to form a pool of molten metal joining a plurality of metal objects. In some instances, welding may involve an application of pressure (e.g., with or without applying intense heat) to connect a plurality metal objects together. Additionally or alternatively, the at least one reinforcing sleeve may be connected to the shaft using one or more additional techniques, such as brazing, soldering, and/or riveting.

In some disclosed embodiments, the at least one reinforcing sleeve has a length greater than an outer diameter of the shaft and extends beyond the outer diameter of the shaft on both sides of the shaft. A length refers to a measure of distance between two points. A length of a reinforcing sleeve refers to a measure of distance between two ends (e.g., extremities) of the reinforcing sleeve. An outer diameter of a shaft refers to a distance between the outer edges of the shaft. A reinforcing sleeve that has a length greater than an outer diameter of the shaft refers to a reinforcing sleeve longer than the distance between the outer edges of the shaft. For instance, positioning the reinforcing sleeve to extend through the shaft may cause at least one end of the reinforcing sleeve to jut out of the shaft, and expose a face of the reinforcing sleeve external to the shaft. A reinforcing sleeve that has a length greater than an outer diameter of the shaft and extends beyond the outer diameter of the shaft on both sides of the shaft refers to a reinforcing sleeve, that when positioned to extend transversely through a shaft opening, juts out to expose a first end of the sleeve on a first side of the shaft and expose a second end of the sleeve on the opposite side of the shaft. In some instances, the lengths of the first and second exposed ends of the reinforcing sleeve extending beyond the outer diameter of the shaft may be substantially the same. In some disclosed embodiments, the sleeve is welded to the shaft on each side of the shaft opening. A sleeve that is welded to a shaft on each side of a shaft opening refers to first and second exposed ends of a shaft sleeve extending through the shaft secured to the shaft by a welding process, as described and exemplified elsewhere herein.

In some disclosed embodiments, the at least one reinforcing sleeve is interposed between the at least one rod and the at least one shaft opening for reinforcing at least one of the shaft, the at least one shaft opening, or the at least one rod against forces exerted by the first blade portion and the second blade portion when fluid impacts the first blade portion and the second blade portion. A force refers to a physical influence on an object attributable to an exertion of energy. For instance, a force may cause motion, stress, strain, and/or wear on one or more physical objects. To exert a force refers to apply, impose, and/or deploy a force, causing a transfer of energy. For instance, when a first object exerts a force on a second object, at least some energy carried by the first object may be transferred to the second object. To impact refers to contact in a manner that causes an effect. For instance, a fluid flow impacting a blade portion connected to a shaft may impose a pushing force on the blade portion, that may cause or attempt to cause the blade to turn around the shaft. A fluid impacting a blade portion refers to fluid motion incident on a blade portion, as described and exemplified elsewhere herein. For instance, such a fluid motion may generate a pressure differential on opposing sides of a blade, thereby imposing a pushing force on the blade causing the blade to move around the shaft. A fluid impacting a first blade portion and a second blade portion refers to a fluid motion incident on two distinct blade portions. Forces exerted by a blade portion when fluid impacts the blade portion refers to a transfer of at least some energy contained in a fluid flow to the first and second blade portions. In some instances, some of these forces may include rotational forces associated with rotational motion of an associated blade or blades about a shaft, and some of these forces may include non-rotational forces associated with vibrations, warping, bending, wobbling, and/or twisting of the blade portions. Thus, in addition to transferring rotational forces to a central shaft via one or more connecting rods for converting to electrical energy by an associated generator, the blade portions may transfer at least some non-rotational forces as well. These non-rotational forces may cause damage to the fluid turbine. For example, a vibrating, wobbling, buckling, twisting, and/or warping motion of one or more of the rods may impose stress on one or more shaft openings, causing a size of one or more shaft openings to increase. Increasing the shaft opening may introduce freedom of movement of the rod relative the shaft, causing a fluid turbine to become unstable and/or unsafe. Additionally or alternatively, vibrating, wobbling, buckling, twisting, and/or warping of one or more of the rods may diminish a vertical alignment of the blade portions relative to the vertically-aligned shaft, leading to imbalance, which may also lead to the fluid turbine becoming unstable and/or unsafe.

Interposed refers to fitted and/or positioned between two objects. For instance, interposing an element between two objects may cause each of the objects to directly interface with the interposing element and thereby prevent direct interfacing between the two objects. Such an interposing element may protect a first of the two objects from being impacted by forces exerted by a second of the two objects. A reinforcing sleeve interposed between a rod and a shaft opening refers to a protective tube encasing a rod extending through a shaft opening. For instance, such a protective tube may prevent direct contact between the rod and the shaft opening by causing the rod and the shaft opening to interface with the protective tube instead of with each other. Reinforcing a shaft, a shaft opening, or a rod against forces exerted by a blade portion when fluid impacts the blade portion refers to protecting and/or shielding a shaft, a shaft opening, and/or a rod from one or more forces transferred by blade portions due to impact by a fluid flow. For instance, such forces may cause stress, wear, warping, and/or damage to a shaft, shaft opening, rod, and/or any other element of a fluid turbine, which may diminish performance of the fluid turbine, and/or lead to instability and/or unsafe operation.

As an example, opposite blade portions impacted by a fluid may transfer forces imposed by the fluid to a rod extending through a central shaft and connected at both ends to the opposite blade portions. Some of the forces may be associated with rotational motion, cause the rod to spin with the opposite blade portions, which may drive the central shaft to rotate as well, allowing a generator to generate electrical energy, as described elsewhere herein. However, some of the forces may be associated with non-rotational motion, as described above. Thus, the blade portions may transfer at least some of the forces associated with non-rotational motion to the at least one rod, shaft opening and/or shaft connected thereto. In absence of a reinforcing sleeve interposed between the rod and the shaft opening, such forces may impose stress causing the rod, shaft, and/or shaft opening to warp, bend, twist, and/or buckle, as described above. However, interposing a reinforcing sleeve between each rod and an associated shaft opening may permit the reinforcing sleeve to absorb at least some of the non-rotational forces, thereby protecting the respective rod, shaft opening and/or shaft from at least some of the warping, bending, twisting, and/or buckling forces. In this manner, one or more reinforcing sleeves may prevent damage to and/or maintain operational performance of a fluid turbine.

By way of a non-limiting example, in FIG. 9, at least one reinforcing sleeve 900 may extend through shaft opening 806. A reinforcing sleeve 900 may be interposed between rod 818 and shaft opening 806 for reinforcing at least one of shaft 802, shaft opening 806, and/or rod 818 against forces exerted by first blade portion 814 and second blade portion 816 (e.g., see FIG. 8) when fluid impacts first blade portion 814 and second blade portion 816. Similarly, a reinforcing sleeve 902 may be interposed between rod 820 and shaft opening 808, and reinforcing sleeve 904 may be interposed between rod 822 and shaft opening 810. In some embodiments, reinforcing sleeves 900, 902, and 904 may be bonded to shaft 802. In some embodiments, reinforcing sleeves 900, 902, and 904 may be welded shaft 802. In some embodiments, reinforcing sleeves 900, 902, and 904 may be made of metal, such as steel.

In some embodiments, reinforcing sleeves 900, 902, and 904 may have a length greater than an outer diameter of shaft 802. For instance, reinforcing sleeves 900, 902, and 904 may extend beyond the outer diameter of shaft 802 on both sides of shaft 802. In some embodiments, reinforcing sleeves 900, 902, and 904 may be welded or bonded to shaft 802 on each side of shaft openings 806, 808, and 810, respectively.

In some disclosed embodiments, the at least one shaft opening includes a plurality of shaft openings, the at least one sleeve includes a plurality of sleeves, and the at least one rod includes a plurality of rods each of the plurality of rods extending through a differing one of the plurality of sleeves and a differing one of the plurality of shaft openings. A plurality of shaft openings refers to multiple orifices, holes, and/or apertures penetrating and/or passing through a shaft. For instance, a plurality of shaft openings may form multiple channels and/or passages through the shaft. In some embodiments, at least some of the plurality of shaft openings may extend transversely through (e.g., perpendicular to) the shaft. At least one sleeve that includes a plurality of sleeves refers to multiple reinforcing sheaths, tubes, and/or encasements. At least one rod that includes a plurality of rods refers to multiple bars and/or poles. A plurality of rods extending through a differing one of the plurality of sleeves and a differing one of the plurality of shaft openings refers to multiple rods, each rod passing through a different sleeve located in a different channel passing through a turbine shaft. For instance, the plurality of sleeves may insulate the plurality of rods passing transversely through a turbine shaft from interfacing directly with any of the shaft openings, and/or with any other one of the plurality of rods. Consequently, the plurality of sleeves may absorb at least some of the vibrating, wobbling, buckling, twisting, and/or warping motion transferred to the plurality of rods by the first and/or second blade portions, thereby protecting any of the rods, shaft, and/or shaft openings from associated stress, wear, and/or deformations.

In some embodiments, at least some of the plurality of rods may have differing lengths. For example, a blade portion may have a curved and/or contoured shape such that distances between different locations on each blade portion to a turbine shaft may vary. The lengths of the rods may vary accordingly, to enable connecting the turbine shaft to the different locations on each blade portion using the plurality of rods.

By way of a non-limiting example, in FIGS. 8-9, fluid turbine 800 includes a plurality of shaft openings 806, 808, and 810. Plurality of sleeves 900, 902, and 904 may extend through openings 806, 808, and 810 of shaft 802, respectively. Plurality of rods 818, 820, and 822 may each extend through a differing one of plurality of sleeves 900, 902, and 904, and a differing one of plurality of shaft openings 806, 808, and 810, respectively.

In some disclosed embodiments, the plurality of openings are distributed along a portion of the length of the shaft. Distributed refers to spread out, and/or dispersed. Distributed along a portion of the length of the shaft refers to spread out along a section of the shaft. For example, each of the plurality of openings in the shaft may extend transversely through the shaft at differing heights along the shaft. In some embodiments, the heights along the shaft separating at least some of the plurality of openings may correspond to a clearance distance associated with an outer diameter of each sleeve. For instance, a plurality of rods passing through a shaft via a plurality of reinforcing sleeves extending through associated openings in the shaft may be clustered into one or more groups distributed at different levels along the length of the shaft. Within each group, each opening in the shaft may be separated from an adjacent opening by clearance distances corresponding to the outer diameters of the associated reinforcing sleeves, permitting the rods extending therethrough to be substantially clustered at an associated level along the shaft. However, each group may be separated from an adjacent group by a distance substantially greater than the clearance distances of the sleeves, permitting to distribute clusters of relatively closely spaced rods at different levels along the shaft. In some embodiments, a shaft may be associated with at least two clusters of threaded rods extending therethrough connecting first and second blade portions to the shaft.

In some disclosed embodiments, radial orientations of at least some of the plurality of shaft openings and the plurality of rods differ from at least some other radial orientations of shaft openings and rods. Radial orientations refer to angular directions corresponding to radii and/or diameters of a circle. Radial orientations of at least some of the plurality of shaft openings and the plurality of rods differ from at least some other radial orientations of shaft openings and rods refers to at least some of the rods extending through the shaft via associated sleeves and openings pointing at different directions than some of the other rods extending through the shaft via associated sleeves and openings. For example, if a first rod extending through a shaft via a first associated sleeve and opening is oriented at 0°, a second rod extending through the shaft via a second associated sleeve and opening may be oriented at 120°, and a third rod extending through the shaft via a second associated sleeve and opening may be oriented at 240°. As another example, a first rod may be oriented at 0°, a second rod may be oriented anywhere between 30° and 80° of the first rod, and a third rod may be oriented anywhere between 30° and 80° of the second rod.

For instance, a plurality of rods may be clustered into groups of threes. At a first level along a shaft, a first group of three rods may extend through the shaft via a first group of associated sleeves and openings, separated by clearance distances for the first set of respective sleeves. Within the first group, each rod, associated sleeve and opening may have different radial orientations (e.g., 0°, 120°, and 240°). At a second level along the shaft separated from the first level by a substantially larger distance than the clearance for the sleeves, a second group of three rods may extend through the shaft via a second group of associated sleeves and openings, separated by clearance distances for the second set of respective sleeves. Within the second group, each rod, associated sleeve and opening may also have different radial orientations (e.g., 0°, 120°, and 240°), and so on. In this manner, a vertical fluid turbine may support one or more vertically-oriented blades of varying heights via a plurality of rods at different radial orientations. Such a design may enable building a modular vertical blade configuration for a vertically-oriented fluid turbine.

By way of a non-limiting example, in FIGS. 8-9, plurality of openings 806, 808, and 810 may be distributed along a portion of a length of shaft 802. Radial orientations of at least some of shaft openings 806, 808, and 810 and plurality of rods 818, 820, and 822 may differ from at least some other radial orientations of shaft openings 806, 808, and 810 and rods 818, 820, and 822. For example, rods 818, 820, and 822 may fan out to span an arc of 180° at both ends. In some embodiments, rods 818, 820, and 822 may fan out to span an arc of 150°, or an arc of 150°, or any other angle. In some embodiments, additional rods (e.g., clusters 836 and 838 of rods) may be distributed along a portion of a length of shaft 802. Each of clusters 836 and 838 may include a plurality of rods extending through shaft 802 at differing radial orientations, in a similar fashion to rods 818, 820, and 822.

In some disclosed embodiments, the plurality of rods are threaded. A threaded rod refers to a rod having a ridge spiraling around the rod along the length of the rod. The spiraling ridge may be configured to engage with a corresponding spiraling groove, to thereby secure the rod at the location of the engagement.

Some disclosed embodiments involve a plurality of aerodynamic sleeves for covering exposed threaded portions of the plurality of rods. An aerodynamic sleeve may refer to a tube and/or sheath having a surface configured to reduce drag from a fluid flow. In some instances, an aerodynamic sleeve may be smooth and/or rounded. An exposed threaded portion of a rod refers to a section of a threaded rod that is uncovered, revealing at least part of the ridge spiraling around the rod to a fluid flow. For instance, exposing part of the ridge spiraling around the rod to a fluid flow may induce drag and/or cause noise. Such drag may interfere with the blade motion of the fluid turbine, and may be associated with diminished performance. Noise may be undesirable for fluid turbines located in urban areas. A plurality of aerodynamic sleeves for covering exposed threaded portions of the plurality of rods refers aerodynamic sleeves extending over exposed threaded portions of at least some of the rods. In some embodiments, such sleeves may prevent exposure of some or all of the threaded portions to a fluid flow. For example, placing aerodynamic sleeves on exposed threaded portions of at least some of the rods may reduce at least some of the drag and/or noise.

In some disclosed embodiments, the plurality of aerodynamic sleeves are made of plastic material. A plastic material refers to a substance made from organic polymers derived from petrochemicals, cellulose, coal, and/or any other suitable organic compound. Some examples of plastic materials may include polyvinyl chloride (PVC), high-density polyethylene (HDPE), and/or polyethylene terephthalate (PET). A plastic material may be light weight, and may be molded into a variety of shapes, such as a smooth, aerodynamic cover for a threaded rod.

Figure 10:
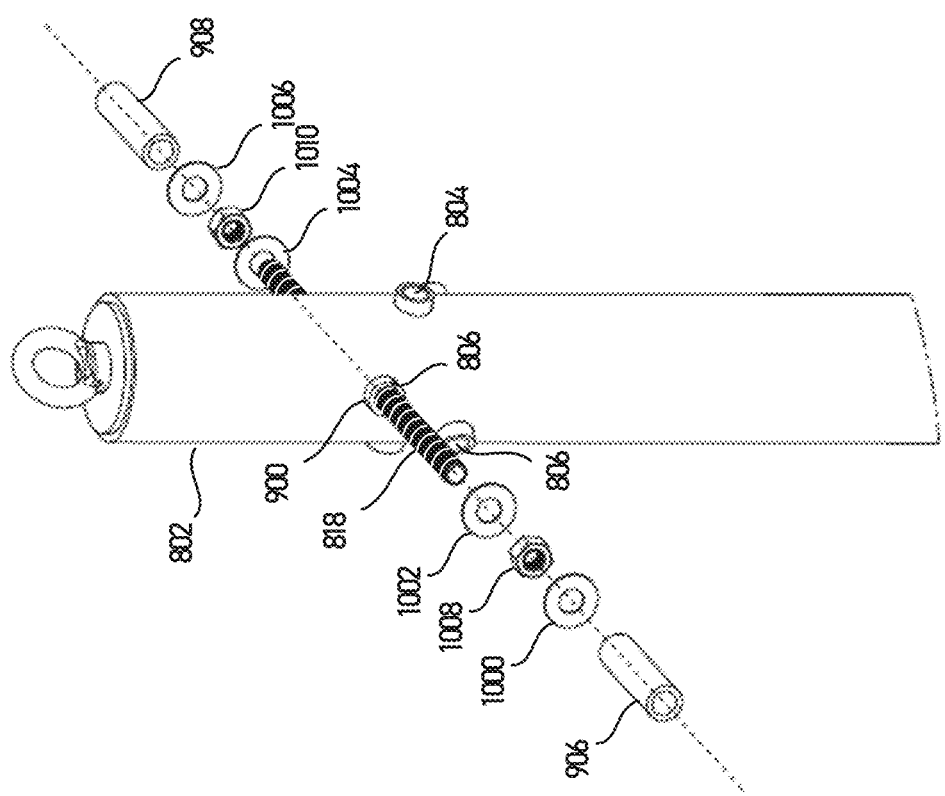
FIG. 10 is an exemplary exploded view of the vertically orientable turbine shaft of FIG. 8, consistent with some embodiments of the present disclosure.

By way of a non-limiting example, reference is made to FIG. 10, which is an exemplary exploded view of vertically orientable shaft 802, consistent with some embodiments of the present disclosure. Shaft 802 is shown rod 818 extending therethrough via opening 806. Rod 818 may be threaded. In a similar manner, rods 820 and 822, and rods in clusters 836 and 838, shown in FIGS. 8-9 may be threaded.

Referring to FIG. 9, In some embodiments, a plurality of aerodynamic sleeves 906 and 908, 910 and 912, and 914 and 916 may cover exposed threaded portions of plurality of rods 818, 820, and 822, respectively. In some embodiments, aerodynamic sleeves 906 and 908, 910 and 912, and 914 and 916 may be made of plastic material, such as PVC.

Some disclosed embodiments involve a plurality of washers, each washer being interposed between one of the plurality of reinforcing sleeves and one of the plurality of aerodynamic sleeves. A washer refers to a thin plate with a hole. In some instances, a washer may be disk shaped. A washer may be used to distribute a load of a threaded fastener, such as a bolt and/or nut, as a spacer along an elongated bar, as a spring, and/or to absorb stress and prevent an imposition of stress on an object. A washer being interposed between a reinforcing sleeves and an aerodynamic sleeve refers to a washer positioned anywhere between and end of a reinforcing sleeve and an end of an aerodynamic sleeve. For example, a threaded rod may pass through the opening of one or more washers. In some instances, a washer may be located adjacent to an end of an associated aerodynamic sleeve covering the threaded bar, thereby securing a position of the associated aerodynamic sleeve along the threaded bar. In some instances, a washer may be located adjacent to an end of an associated reinforcing sleeve, thereby exerting pressure against the reinforcing sleeve to secure and/or stabilize the associated threaded rod against the reinforcing sleeve.

By way of a non-limiting example, in FIG. 10, fluid turbine 800 (see FIG. 8) may include a plurality of washers 1000, 1002, 1004, and 1006. Threaded rod 818 may pass through the holes of washers 1000, 1002, 1004, and 1006. Plurality of washers 1000, 1002, 1004, and 1006 may be interposed between reinforcing sleeve 900 (see FIG. 9) and one of aerodynamic sleeves 906 and 908. For example, pair of washers 1000, 1002 may be interposed between reinforcing sleeve 900 and aerodynamic sleeve 906 on a first side of shaft 802, and pair of washers 1004, 1006 may be interposed between reinforcing sleeve 900 and aerodynamic sleeve 908 on a second side of shaft 802. In a similar manner, threaded rods 820 and 822 may pass through a plurality of washers interposed between reinforcing sleeves 902 and 904, and aerodynamic sleeves 910 and 912; and 914 and 916 on either side of shaft 802, respectively. Similarly, the rods in clusters 836 and 838 may pass through a plurality of washers interposed between respective reinforcing sleeves and aerodynamic sleeves.

Some disclosed embodiments involve a plurality of threaded nuts, each threaded nut being interposed between one of the plurality of washers and one of the plurality of aerodynamic sleeves. A threaded nut refers to a fastener with a hole therethrough having a groove spiraling therein. For instance, a spiraling groove on a threaded nut may be configured to engage with a spiraling ridge of an elongated object (e.g., a screw, a bolt, and/or any other type of threaded rod) extending through the hole of the threaded nut, thereby creating a locked joint. A threaded nut being interposed between a washer and an aerodynamic sleeve refers to a threaded nut located midway between a washer and an end of an aerodynamic sleeve. For example, a threaded rod may pass through the opening of a threaded nut and one or more associated washers. A section of the spiraling ridge of the threaded rod may engage with the spiraling groove of the threaded nut, thereby securing a position of the threaded nut along the length of the threaded rod. In some embodiments, a first one of the associated washers may be located adjacent to an end of an associated reinforcing sleeve, such that the threaded nut may be interposed between the first washer and the associated aerodynamic sleeve. For instance, the first washer, located between the threaded nut and the end of the reinforcing sleeve, may push against the end of the reinforcing sleeve to distribute forces imposed thereon by the threaded rod to prevent stress from warping, bending, and/or otherwise deforming the threaded rod, the reinforcing sleeve, the shaft opening, and/or the shaft.

In some disclosed embodiments, each of the plurality of nuts is sandwiched between two of the plurality of washers. A nut sandwiched between two washers refers to a nut positioned with a first washer on a first side of the nut and a second washer on a second side of the nut. For example, a threaded rod may pass through a first washer, a threaded nut, and a second washer. The threaded nut may lock a position thereon along the length of the threaded rod. The first washer on the first side of the nut may push against an end of an associated reinforcing sleeve, as describe earlier. The second washer on the second side of the nut may push against an end of an associated aerodynamic sleeve, thereby sandwiching the threaded nut between the first and second washers, and sandwiching the threaded nut and first and second washers between the end of the reinforcing sleeve and the end of the aerodynamic sleeve. For instance, the second washer may push against the end of the aerodynamic sleeve to distribute forces imposed thereon by the threaded rod (e.g., to prevent cracking and/or breakage) and secure the position of the aerodynamic sleeve along the length of the threaded rod.

By way of a non-limiting example, in FIG. 10, fluid turbine 800 (see FIG. 8) may include a plurality of threaded nuts 1008 and 1010. Threaded nut 1008 may be interposed between washer 1002 and aerodynamic sleeve 906, and threaded nut 1010 may be interposed between washer 1004 and aerodynamic sleeve 908. In some embodiments, threaded nut 1008 may be sandwiched between washers 1000 and 1002, and threaded nut 1010 may be sandwiched between washers 1004 and 1006.

Some disclosed embodiments involve a plurality of horizontal ribs, each of the first blade portion and the second blade portion, having at least one distinct rib associated therewith. A rib refers to a structural element that provides reinforcement or stability to an object. It may refer to a supportive structure having an arc-like shape. For example, a rib may withstand impact from forces that may otherwise cause an element to break. A horizontal rib refers to a rib oriented horizontally or laterally, relative to a vertically oriented shaft such that the rib may be substantially perpendicular to the shaft. Each of the first blade portion and the second blade portion, having at least one distinct rib associated therewith refers to at least one first rib associated with the first blade portion and at least one second rib associated with the second blade portion. For example, such a rib may provide structural support to the first or the second blade portions and may absorb one or more stresses imposed thereon to prevent warping, deformation, and/or breakage. Additionally or alternatively, such a rib may serve as a windbreaker in the interior region of a fluid turbine. For instance, a horizontal rib may facilitate in overcoming a centripetal force that may otherwise cause an associated blade portion to become detached, and/or to overcome a torque induced by the associated blade portion.

In some disclosed embodiments, each rib is connected to more than one of the plurality of rods. A rib connected to more than one of a plurality of rods refer to a rib connected to at least two of the plurality of rods. In some embodiments, each rib may be connected to at least three of the plurality of rods. For example, a cluster of two or more rods may pass through a shaft via two or more associated sleeves extending through two or more associated openings in the shaft. An end of each rod in such a cluster may connect to a single rib. In some embodiments, the first ends of each rod in a cluster may connect to a first rib associated with the first blade portion, and the second ends of each of the rods in the cluster may connect to a second rib associated with the second blade portion. The first and second ribs may withstand at least some of the forces imposed by the plurality of rods at the locations where the rods connect to the first and second blade portions, to thereby protect the integrity of the first and second blade portions.

Figure 11:
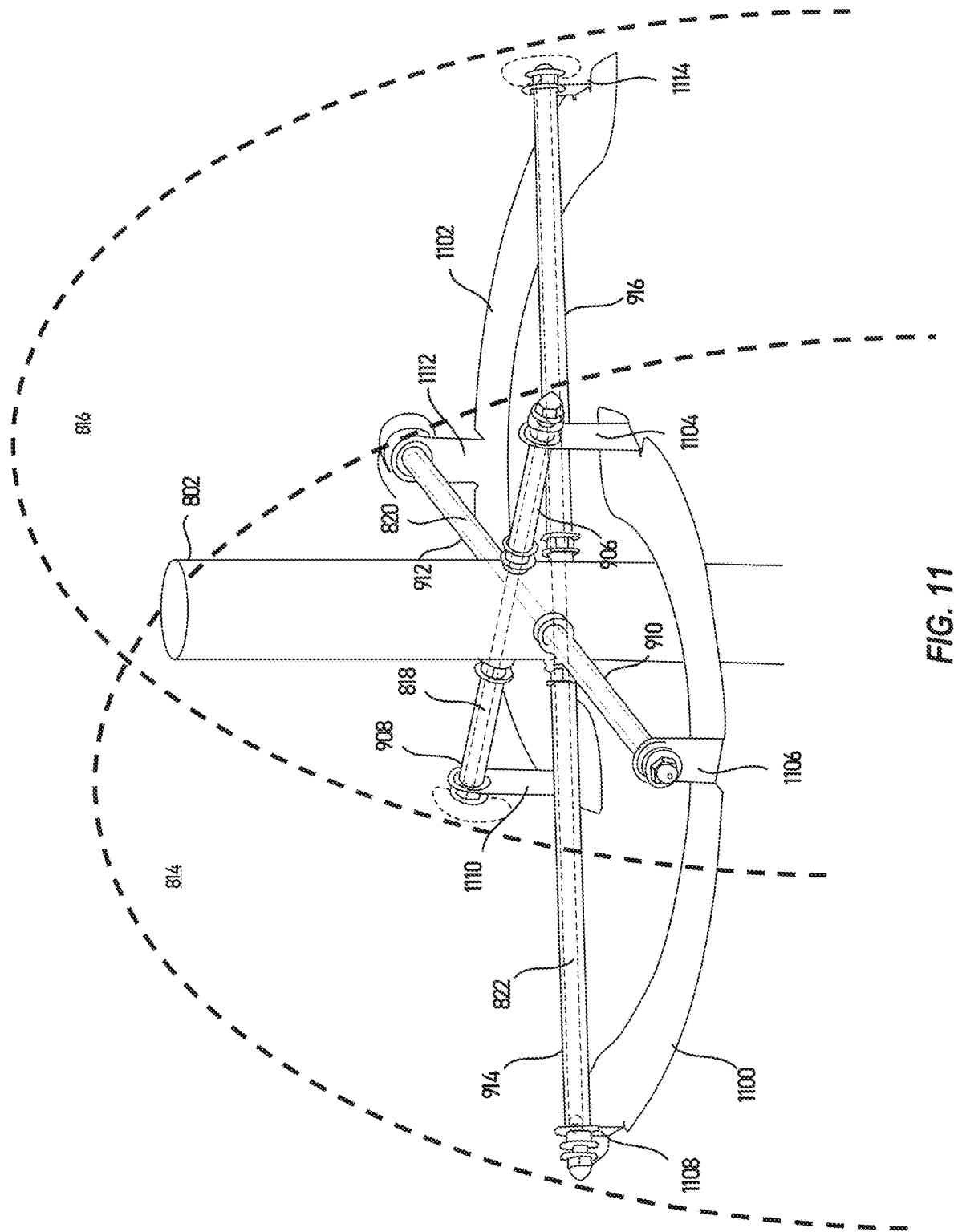
FIG. 11 is an exemplary schematic diagram of the fluid turbine of FIG. 8 including a plurality of horizontal ribs for connecting a plurality of rods to first and second blade portions, consistent with some embodiments of the present disclosure.

By way of a non-limiting example, reference is made to FIG. 11, which is an exemplary schematic diagram of fluid turbine 800, including a plurality of horizontal ribs 1100 and 1102 for connecting plurality of rods 818, 820, and 822 to first and second blade portions 814 and 816, consistent with some embodiments of the present disclosure. First blade portion 814 may be associated with horizontal rib 1100, and second blade portion 816 may be associated with horizontal rib 1102. Each of ribs 1100 and 1102 may be connected to rods 818, 820, and 822 (e.g., at opposing ends thereof). Ribs 1100 and 1102 may serve as windbreakers to diminish draft around shaft 802. In some embodiments, fluid turbine 800 may include additional ribs distributed along the length of shaft for connecting clusters 836 and 838 of rods to blade portions 814 and 816, as shown in FIG. 8.

In some disclosed embodiments, each rib includes a plurality of holed tabs extending vertically therefrom, each holed-tab for engaging with a distinct one of the plurality of rods. A holed tab refers to a pierced and/or perforated stub and/or extension. It may refer to a small, flat, or slightly raised portion of material with a hole or opening in it. Each rib including a plurality of holed tabs extending vertically therefrom refers to at least two perforated stubs and/or extensions emerging from each horizontal rib, where each of the perforated stubs may be substantially perpendicular to the horizontal rib. In some instances, the holed tabs may be integrally formed with the associated ribs, and in some instances, the holed tabs may be connected to the associated rib using one or more screws and/or bolts. Each holed-tab for engaging with a distinct one of the plurality of rods refers to each perforation of each holed tab configured to connect to a particular one of the plurality of rods. For example, each perforation of each holed tab may receive a distinct end of a distinct rod.

In some disclosed embodiments, the holed tabs have differing heights. The holed tabs have differing heights refers to each of the holed tabs extending vertically from an associated horizontal rib having a different length. In some disclosed embodiments, the differing heights are associated with clearance distances between more than one of the plurality of sleeves interposed between a differing one of the plurality of rods connected to each rib and a differing one of the plurality of shaft openings. A clearance distance refers to a physical space just sufficient to maintain a separation between two or more objects. In some instances, a clearance distance may include a tolerance for distortion due to motion, wear, expansion and/or contraction due to changes in temperature, and/or any other factor affecting a space separating two or more objects. The differing heights are associated with clearance distances between more than one of the plurality of sleeves interposed between a differing one of the plurality of rods connected to each rib and a differing one of the plurality of shaft openings refers to the differing heights of the holed tabs of each rib corresponding to the differing heights of some of the plurality of sleeves separated therebetween by clearing distances. For example, as noted earlier, the plurality of rods may be organized in one or more clusters of rods distributed along the length of the shaft. Within each cluster, the distances separating adjacent sleeves surrounding each rod in the cluster and extending through the shaft via associated shaft openings may correspond to clearing distances. Each rib may be associated with a particular cluster of rods arranged thus, such that the first ends of each rod in a particular cluster may engage with the first blade portion via the holed tabs of the first rib, and the second ends of each rod in the cluster may engage with the second blade portion via the holed tabs of the second rib. Since each rod may be separated from an adjacent rod in the cluster by the clearance distance, engaging with holed tabs at heights associated with the clearance distances may maintain each rod in a substantially horizontal orientation relative to the vertically oriented shaft.

By way of a non-limiting example, in FIG. 11, rib 1100 may include holed tabs 1104, 1106, and 1108 extending vertically from rib 1100, and rib 1102 may include holed tabs 1110, 1112, and 1114 extending vertically from rib 1102. Holed-tab 1104 may engage with rod 818 (e.g., at first end 824 thereof), holed-tab 1106 may engage with rod 820 (e.g., at first end 826 thereof), and holed-tab 1108 may engage with rod 822 (e.g., at first end 828 thereof). Similarly, holed-tab 1110 may engage with rod 818 (e.g., at second end 830 thereof), holed-tab 1112 may engage with rod 820 (e.g., at second end 832 thereof), and holed-tab 1114 may engage with rod 822 (e.g., at second end 834 thereof).

In some embodiments, holed tabs 1104, 1106, and 1108 may have differing heights, and holed tabs 1110, 1112, and 1114 may have differing heights. However, holed tabs 1104 and 1114 for engaging with rod 818 may have substantially similar heights to maintain rod 818 substantially horizontal. Similarly, holed tabs 1106 and 1112 for engaging with rod 820, and holed tabs 1108 and 1110 for engaging with rod 822 may have substantially similar heights to maintain rods 820, and 822 substantially horizontal. In some embodiments, rods 818, 820, and 822 may have different lengths, e.g., to account for a curvature of blade portions 814 and 816.

Figure 12:
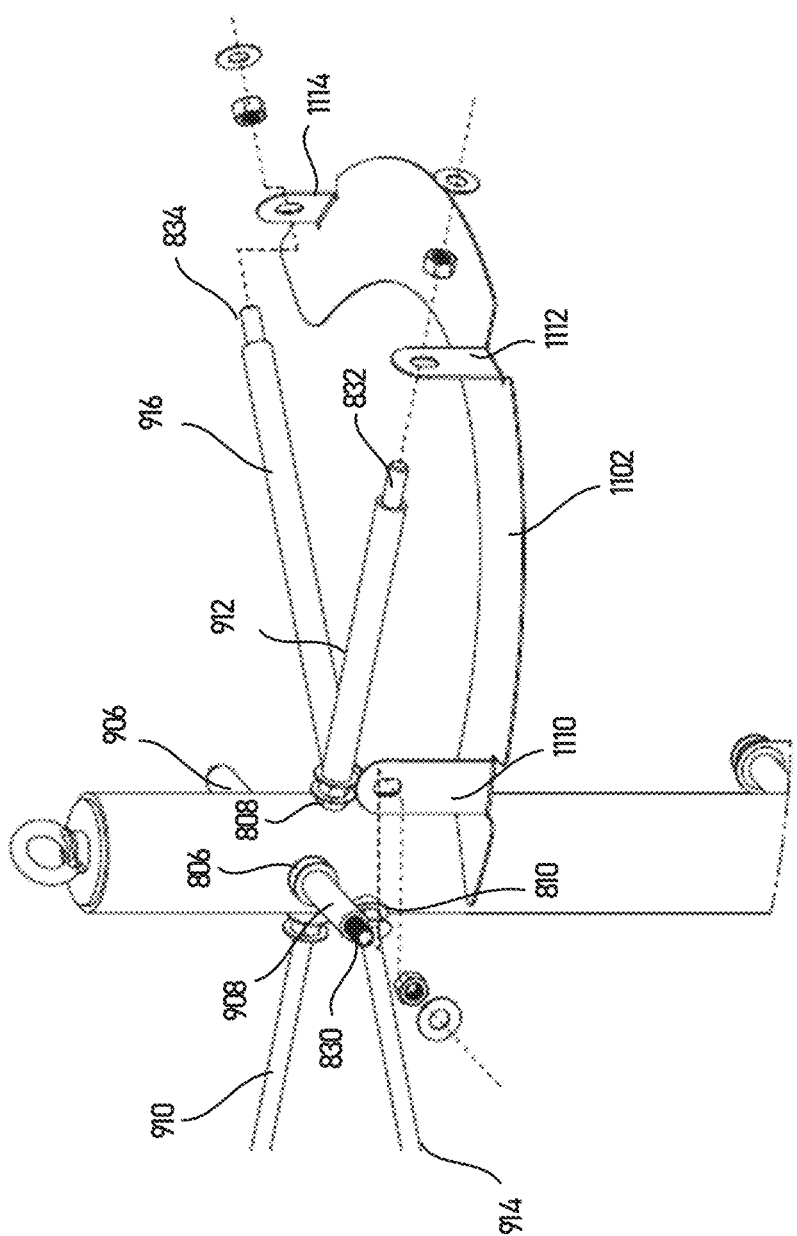
FIG. 12 is an exemplary exploded view of the vertically-orientable turbine shaft of FIG. 8 for connection to a rib via a plurality of rods, consistent with some embodiments of the present disclosure.

By way of another non-limiting example, reference is made to FIG. 12, which is an exemplary exploded view of horizontal rib 1102 connecting plurality of rods 818, 820, and 822 to second blade portion 816 (not shown), consistent with some embodiments of the present disclosure. Holed-tab 1110 may engage with second end 830 of rod 818, holed-tab 1112 may engage with second end 832 of rod 820, and holed-tab 1114 may engage with second end 834 of rod 822.

In some embodiments, the differing heights of holed tabs 1104, 1106, and 1108 and 1110, 1112, and 1114 may be associated with clearance distances between sleeves 900, 902, and 904 (see FIG. 9) interposed between rods 818, 820, and 822 connected to each rib 1100 and 1102 and a differing one of shaft openings 806, 808, and 810, respectively. Similar configurations with ribs configured with holed tabs may be provided for additional clusters of rods (e.g., clusters 836 and 838) that may be distributed along the length of shaft 802.

In some disclosed embodiments, each of the holed tabs is interposed between an associated blade surface and a distal end of an associated one of the aerodynamic sleeves. A holed tab interposed between an associated blade surface and a distal end of an associated aerodynamic sleeve refers to a holed tab interfacing between a surface of a blade and a tip of the associated aerodynamic sleeve. For example, a distal side of a vertically oriented holed tab may press against an inner surface of a vertically oriented blade, to thereby distribute forces imposed by a threaded rod engaging with a hole of the holed tab, and a proximal side of the vertically oriented hold tab may press against the distal end of the aerodynamic sleeve covering the threaded rod to secure the aerodynamic sleeve in place over the threaded rod.

By way of a non-limiting example, in FIGS. 11-12, each of holed tabs 1104, 1106, and 1108 may be interposed between an inner surface of first blade portion 814 and a distal end of aerodynamic sleeves 906, 910, and 914 covering threaded rods 818, 820, and 822, respectively. Similarly, each of holed tabs 1110, 1112, and 1114 may be interposed between an inner surface of second blade portion 816 and a distal end of an associated one of aerodynamic sleeves 908, 912, and 916 covering threaded rods 818, 820, and 822, respectively.

In some disclosed embodiments, a plurality of washers and a threaded nut are interposed between the distal ends of the aerodynamic sleeves and the associated blade surface. A plurality of washers and a threaded nut interposed between the distal ends of the aerodynamic sleeves and the associated blade surface refers to at least two washers and a threaded nut interfacing between the tips of each aerodynamic sleeve and a surface of a turbine blade. For example, a pair of washers sandwiching a threaded nut may interface between a distal end of an aerodynamic sleeve and an inner surface of a turbine blade. A proximal washer of the pair of washers may press against the distal end of the aerodynamic sleeve (e.g., to distribute forces imposed thereon), the threaded nut sandwiched between the pair of washers may lock a position of the threaded bar engaged therewith, and a distal washer of the pair of washers may press against one of the holed tabs pressed flush against an inner surface of a turbine blade (e.g., to distribute forces imposed thereon). In some embodiments each turbine blade may include a plurality of holes, each hole associated with a different end of a distinct rod of the plurality of rods. Each end of each threaded rod may penetrate through the associated hole in the associated turbine blade portion, such that each distal end of each threaded rod may be exposed on the external sides of the first and second blade portions. In such a case, each distal end of each threaded rod may engage with an external threaded nut located on the external side of the first and second blade portions. In some embodiments, an external washer may be interposed on each distal end of each threaded rod, between the external surface of the first and second blade portions and the external threaded nut. For instance, the external washer may distribute forces exerted thereon by the threaded rods penetrating through the turbine blade portions. In some embodiments, the external threaded nut may have a smooth aerodynamic surface, such as a domed shaped.

By way of another non-limiting example, in FIG. 9, a plurality of washers 918 and 920, and a threaded nut 922 may be interposed between the distal ends of aerodynamic sleeve 906 and an associated blade surface of first blade portion 814 (e.g., indicated by gap 924), e.g., at first end 824 of rod 818. For example, washers 918 and 920, and threaded nut 922 may secure first end 824 of rod 818 against holed tab 1104, thereby connecting rod 818 to first blade portion 814 (see FIG. 11). Similarly, a plurality of washers 926 and 928, and a threaded nut 930 may be interposed between the distal ends of aerodynamic sleeve 908 and an associated blade surface of second blade portion 816 (e.g., indicated by gap 932), e.g., at second end 830 of rod 818. For example, washers 926 and 928, and threaded nut 930 may secure second end 830 of rod 818 against holed tab 1110, thereby connecting rod 818 to second blade portion 816. In a similar manner, a plurality of washers and threaded nuts may be interposed between the distal ends of aerodynamic sleeves 910, 912, 914, and 916 and associated blade surfaces of first and second blade portions 814 and 816, respectively. For example, a pair of washers sandwiching a threaded nut may secure each end of each of threaded rods 820 and 822 to holed tabs 1106, 1108, 1112, and 1114 to thereby connect threaded rods 820 and 822 to first and second blade portions 814 and 816, respectively.

In some embodiments, threaded rods 818, 820, and 822 may penetrate through holes in first and second blade portions 814 and 816. In such a case, one or more additional washers and/or threaded nuts may secure each end of each of threaded rods 818, 820, and 822 to an external surface of first and second blade portions 814 and 816. In some embodiments, an external threaded nut may cover each end of threaded rods 818, 820, and 822 on an external surface of first and second blade portions 816 and 818. In some instances, the external threaded nuts may have a round, smooth aerodynamic shape (e.g., a domed shape).

Figure 13:
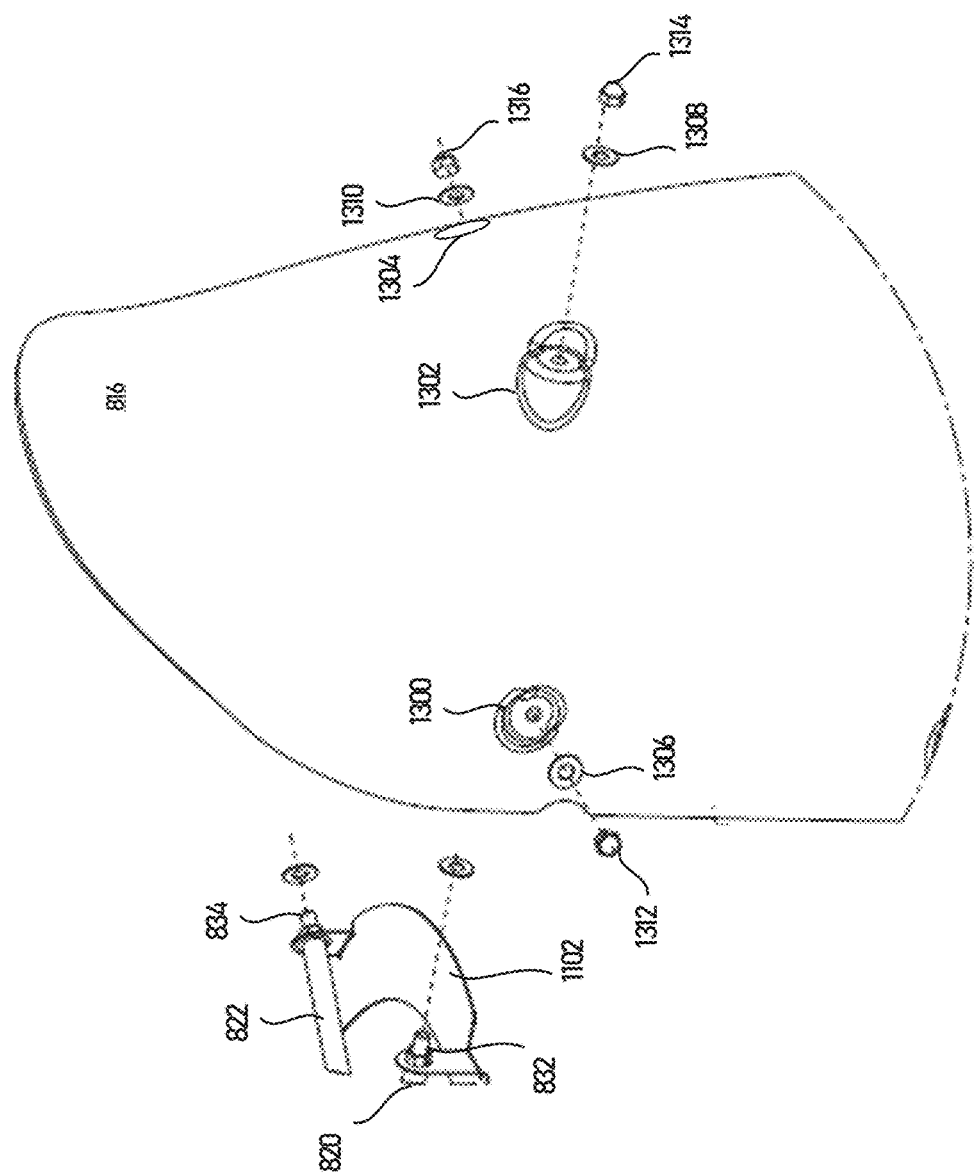
FIG. 13 is an exemplary exploded view of a turbine blade for connection to a rib via a plurality of rods, consistent with some embodiments of the present disclosure.

By way of another non-limiting example, reference is made to FIG. 13, which is an exemplary exploded view of a connection between threaded rods 818, 820, and 822 connected to second blade portion 816, consistent with some embodiments of the present disclosure. Second blade portion 816 may include a plurality of holes 1300, 1302, and 1304, each associated with a different one of threaded rods 818, 820, and 822. Second end 834 of threaded rod 822 may extend through hole 1304 of second blade portion 816, second end 832 of threaded rod 820 may extend through hole 1302, and second end 830 of threaded rod 818 (not shown) may extend through hole 1300. The ends of rods 818, 820, and 822 may be secured on an external face of blade portion 816 by a plurality of washers 1306, 1308, and 1310 and threaded domed nuts 1312, 1314, and 1316. In a similar manner, first ends 824, 826, and 828 of threaded rods 818, 820, and 822, respectively, may connect to an external side of first blade portion 814.

In some disclosed embodiments, each of the plurality of ribs is contoured to correspond to a contour of an associated internal blade surface. Contoured refers to shaped. It may refer to being curved and/or bent. A contour of an associated internal blade surface refers to a curved (e.g., concave) shape of an interior face of a turbine blade. For example, a turbine blade may be bent and/or curved for associated aerodynamic properties. An inner surface of such a blade may be concave and an outer surface of such a blade may be convex. A rib that is contoured to correspond to a contour of an associated internal blade surface refers to a rib having a curved shape for fitting against an inner contoured surface of a blade portion. For instance, providing a tight fit between a rib and an associated internal blade surface may prevent deformation, warping, and/or buckling due to forces imposed thereon by a plurality of rods connected to the internal blade surface via the associated tabs of each rib.

By way of a non-limiting example, in FIG. 11, ribs 1100 and 1102 may be contoured to correspond to a contour of associated internal surface of blade portions 814 and 816, respectively.

Figure 14:
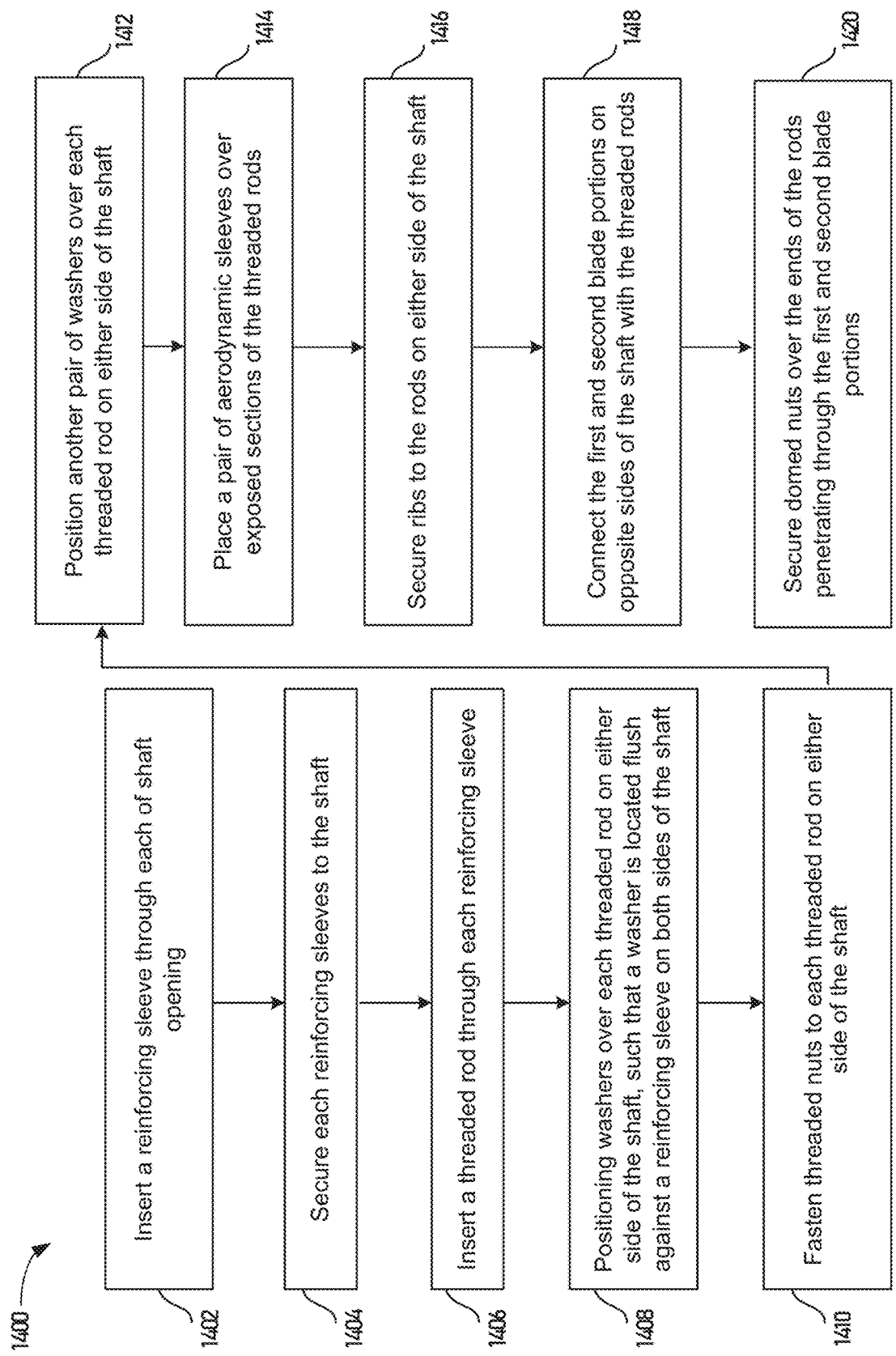
FIG. 14 is a flowchart of an exemplary method of assembly for a fluid turbine, consistent with some embodiments of the present disclosure.

FIG. 14 is a flowchart of an example method 1400 for assembling a vertically oriented fluid turbine. Referring to FIG. 14, method 1400 may include a step 1402 of inserting a reinforcing sleeve through each of the shaft openings. For example, a vertically orientable shaft may include a plurality of openings extending therethrough. At least two of the openings may be oriented differently and may be located at heights spaced by a clearing distance associated with an external diameter of a reinforcing sleeve. At least two of the reinforcing sleeves extending through the openings may thus be oriented differently and may be located at heights separated by an associated clearing distance. By way of a non-limiting example, in FIG. 9, threaded rods 818, 820, and 822 may be inserted through reinforcing sleeves 900, 902, and 904, through each shaft opening 806, 808, and 810, respectively.

Method 1400 may include a step 1404 of securing each of the reinforcing sleeves to the shaft. For example, each of the reinforcing sleeves may be welded to the turbine shaft. By way of a non-limiting example, in FIG. 9, each of reinforcing sleeves 900, 902, and 904 may be secured to shaft 802.

Method 1400 may include a step 1406 of inserting a threaded rod through each of the reinforcing sleeves. For example, at least two of the threaded rods may be oriented differently and may be located at heights separated by a distance associated with at least one of the reinforcing sleeves. By way of a non-limiting example, in FIG. 9, threaded rods 818, 820, and 822 may be inserted through each of reinforcing sleeves 900, 902, and 904.

Method 1400 may include a step 1408 of positioning a first pair washers over each threaded rod on either side of the shaft, such that a first washer of the first pair of washers is located flush against a reinforcing sleeve on a first side of the shaft, and a second washer of the first pair of washers is located flush against the reinforcing sleeve on a second side of the shaft. By way of a non-limiting example, in FIG. 10, a first pair washers 1002 and 1004 may be positioned over threaded rod 818 on either side of 802 shaft, such that washer 1002 may be located flush against reinforcing sleeve 900 on a first side of shaft 802, and washer 1004 may be located flush against the reinforcing sleeve on a second side of shaft 802.

Method 1400 may include a step 1410 of fastening a first pair of threaded nuts to each threaded rod on either side of the shaft. This may cause a first threaded nut of the first pair of threaded nuts to secure the first washer of the first pair of washer on the first side of the shaft, and a second threaded nut of the first pair of threaded nuts to secure the second washer of the first pair of washer on the second side of the shaft. By way of a non-limiting example, in FIG. 10, a first pair of threaded nuts 1008 and 1010 may be fasted to threaded rod 818 on either side of shaft 802.

Method 1400 may include a step 1412 of positioning a second pair of washers over each threaded rod on either side of the shaft. This may cause a first washer of the second pair of washers to press against the first threaded nut of the first pair of threaded nuts on the first side of the shaft, and a second washer of the second pair of washers to press against the second threaded nut of the first pair of nuts on the second side of the shaft. By way of a non-limiting example, in FIG. 10, a second pair of washers 1000 and 1000 may be positioned over threaded rod 818 on either side of shaft 802.

Method 1400 may include a step 1414 of placing a pair of aerodynamic sleeves over exposed sections of the threaded rods jutting out from the shaft. This may cause a first one of the pair of aerodynamic sleeves to cover a first exposed section of a threaded rod extending past the first washer of the second pair of washers on the first side of the shaft. This may also cause a second one of the pair of aerodynamic sleeves to cover a second exposed section of the threaded rod extending past the second washer of the second pair of washers on the second side of the shaft. By way of a non-limiting example, in FIG. 10, a pair of aerodynamic sleeves 906 and 908 may be placed over exposed sections of threaded rod 818 jutting out from either side of shaft 802.

Method 1400 may include a step 1416 of securing a pair of ribs to a plurality of threaded rods on either side of the shaft. Each rib may have a contoured shape for connecting to at least two threaded rods oriented differently at differing locations of the rib. In addition, since the rods may be at differing heights separated by a clearing distance associated with one or more of the reinforcing sleeves, each rib may include a plurality of holed tabs, each holed tab being a different height and associated with a distinct end of a distinct one of the plurality of threaded rods. For example, the different heights may correspond to the clearing distance associated with one or more of the reinforcing sleeves to thereby maintain each threaded rod in a substantially horizontal orientation relative to the vertically orientable shaft. By way of a non-limiting example, in FIG. 11, ribs 1100 and 1102 may be secured to threaded rods 818, 820, and 822 on either side of shaft 802.

Method 1400 may include a step 1418 of connecting a first blade portion on the first side of the shaft and connecting a second blade portion on the second side of the shaft. The first blade portion may be positioned to engage with the first rib and the first ends of the plurality of threaded rods associated therewith. The second blade portion may be positioned to engage with the second rib and the second ends of the plurality of threaded rods associated therewith. The first ends of the plurality of threaded rods may penetrate through the first blade portion and the second ends of the plurality of threaded rods may penetrate through the second blade portion. By way of a non-limiting example, in FIG. 11, first blade portion 814 may be connected to threaded rods 818, 820, and 822 on the first side of shaft 802, second blade portion 816 may be connected to threaded rods 818, 820, and 822 on the second side of the shaft 802.

Method 1400 may include a step 1420 of positioning domed nuts over the ends of the plurality of rods penetrating through the first and second blade portions. By way of a non-limiting example, in FIG. 13, domed nuts 1312, 1314, and 1316 may be placed over the ends of rods 818, 820, and 822 penetrating through second blade portion 816.

Figure 15:
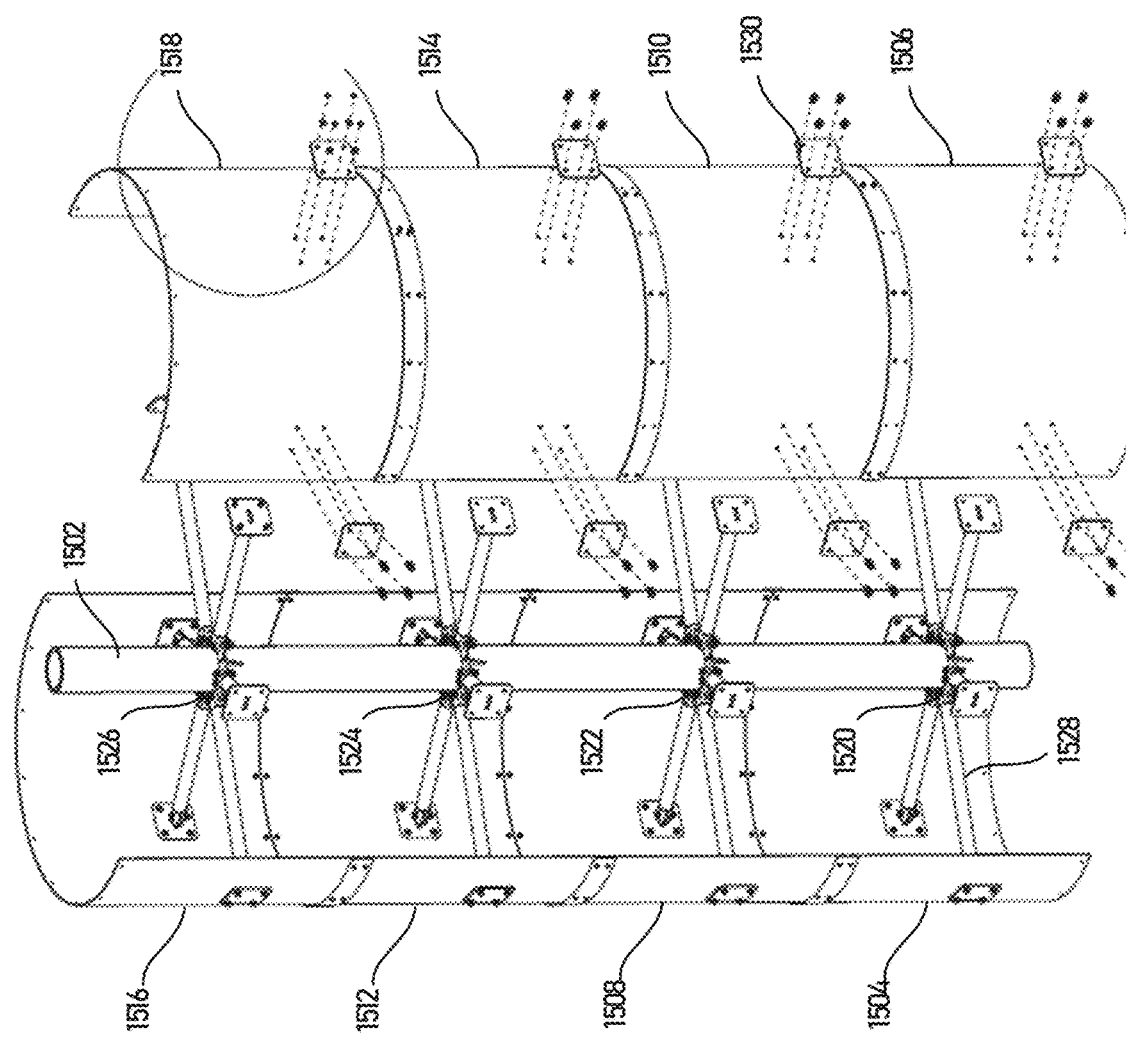
FIG. 15 is an exploded view of an exemplary modular fluid turbine, consistent with some embodiments of the present disclosure.

Reference is now made to FIG. 15, which is an exploded view of an exemplary modular vertically-oriented fluid turbine 1500, consistent with some embodiments of the present disclosure. Fluid turbine 1500 may include a vertically-oriented shaft 1502 and a plurality curved blade pairs 1504 and 1506; 1508 and 1510; 1512 and 1514; and 1516 and 1518. Each of curved blade pairs 1504 and 1506; 1508 and 1510; 1512 and 1514; and 1516 and 1518 may be at the same horizontal level relative to vertically-oriented shaft 1502. Blade pairs 1504 and 1506; 1508 and 1510; 1512 and 1514; and 1516 and 1518 may be stackable, allowing to adjust a height of vertically-oriented fluid turbine 1500. For example, any of blade pairs 1508 and 1510; 1512 and 1514; and 1516 and 1518 may be removed from fluid turbine 1500 to decrease a height of fluid turbine 1500. Alternatively, additional blade pairs may be added to increase a height of fluid turbine 1500 (e.g., up to a height of shaft 1502).

Modular vertically-oriented fluid turbine 1500 may include one or more connector rings 1520, 1522, 1524, and 1526, each associated with a different one of curved blade pairs 1504 and 1506; 1508 and 1510; 1512 and 1514; and 1516 and 1518. Connector rings 1520, 1522, 1524, and 1526 may be distributed along the height of shaft 1502 at differing levels corresponding to levels for connector rings 1520, 1522, 1524, and 1526, respectively. Each of connector rings 1520, 1522, 1524, and 1526 may permit connecting curved blade pairs 1504 and 1506; 1508 and 1510; 1512 and 1514; and 1516 and 1518 to shaft 1502 via a plurality of horizontally-oriented rods 1528. Each level for connector rings may include a plurality of horizontally-oriented rods 1528 oriented at different radial orientations for connecting curved blade pairs 1504 and 1506; 1508 and 1510; 1512 and 1514; and 1516 and 1518 to shaft 1502 at a plurality of locations on curved each blade.

Each proximal end (e.g., oriented towards shaft 1502) of horizontally-oriented rods 1528 may include a fork-shaped connector including at least two prongs configured to clamp onto one of connector rings 1520, 1522, 1524, and 1526 at a specific location. In some embodiments, connector rings 1520, 1522, 1524, and 1526 may be substantially flat and the prongs may be oriented horizontally, allowing the prongs to enclose a section of one of connector rings 1520, 1522, 1524, and 1526, for securing using one or more bolts and nuts. For example, the distance between the prongs may correspond to the thickness of the connector rings.

Each distal end (e.g., oriented away from shaft 1502) of horizontally-oriented rods 1528 may include a vertically-oriented tab 1530 configured to press against an inner side of blade pairs 1504 and 1506; 1508 and 1510; 1512 and 1514; and 1516 and 1518 at a different location. Each of tabs 1530 may be connected to a different location on any one of blade pairs 1504 and 1506; 1508 and 1510; 1512 and 1514; and 1516 using one or more screws and/or bolts. In this manner, blade pairs may be added and/or removed to adjust a height of fluid turbine 1500.

The above-described embodiments of vertically-oriented fluid turbines and their methods of assembly are only exemplary. Many variations are possible. Moreover, the methods described above need not be performed in the order discussed or indicated. Further, several steps may be omitted, combined, and/or some steps added. Furthermore, although some aspects of the disclosed fluid turbines are described with reference to the exemplary configuration illustrated in a figure, the described aspects may be used in a vertically-oriented fluid turbine having any configuration. Other embodiments of the vertically-oriented fluid turbines and their assembly methods will be apparent to those skilled in the art from consideration of the disclosure herein.

The invention claimed is:

1. A fluid turbine, comprising:
a shaft configured for vertical orientation, the shaft having at least one opening extending transversely therethrough;
a first blade portion, configured for vertical orientation on a first side of the shaft;
a second blade portion, configured for vertical orientation on a second side of the shaft, opposite the first side;
at least one rod extending through the at least one shaft opening and configured for connection at a first end thereof to the first blade portion, and at a second end thereof to the second blade portion;
at least one reinforcing sleeve extending through the at least one shaft opening and being interposed between the at least one rod and the at least one shaft opening for reinforcing at least one of the shaft, the at least one shaft opening, or the at least one rod against forces exerted by the first blade portion and the second blade portion when fluid impacts the first blade portion and the second blade portion,
wherein the at least one shaft opening includes a plurality of shaft openings, the at least one sleeve includes a plurality of sleeves, and the at least one rod includes a plurality of rods each of the plurality of rods extending through a differing one of the plurality of sleeves and a differing one of the plurality of shaft openings, and wherein the plurality of rods are threaded; and
a plurality of aerodynamic sleeves for covering exposed threaded portions of the plurality of rods.

2. The fluid turbine of claim 1, wherein the at least one reinforcing sleeve is bonded to the shaft.

3. The fluid turbine of claim 1, wherein the at least one reinforcing sleeve is welded to the shaft.

4. The fluid turbine of claim 3, wherein the at least one reinforcing sleeve has a length greater than an outer diameter of the shaft and extends beyond the outer diameter of the shaft on both sides of the shaft, and wherein the sleeve is welded to the shaft on each side of the shaft opening.

5. The fluid turbine of claim 1, wherein the first blade portion is a separate element from the second blade portion.

6. The fluid turbine of claim 1, wherein the plurality of openings are distributed along a portion of the length of the shaft, and wherein radial orientations of at least some of the plurality of shaft openings and the plurality of rods differ from at least some other radial orientations of shaft openings and rods.

7. The fluid turbine of claim 1, further comprising a plurality of washers, each washer being interposed between one of the plurality of reinforcing sleeves and one of the plurality of aerodynamic sleeves.

8. The fluid turbine of claim 7, further comprising a plurality of threaded nuts, each threaded nut being interposed between one of the plurality of washers and one of the plurality of aerodynamic sleeves.

9. The fluid turbine of claim 8, wherein each of the plurality of nuts is sandwiched between two of the plurality of washers.

10. The fluid turbine of claim 1, wherein the plurality of aerodynamic sleeves are made of plastic material.

11. The fluid turbine of claim 1, further comprising a plurality of horizontal ribs, each of the first blade portion and the second blade portion, having at least one distinct rib associated therewith, and wherein each rib is connected to more than one of the plurality of rods.

12. The fluid turbine of claim 11, wherein each rib includes a plurality of holed tabs extending vertically therefrom, each holed-tab for engaging with a distinct one of the plurality of rods.

13. The fluid turbine of claim 12, wherein the holed tabs have differing heights.

14. The fluid turbine of claim 13, when the differing heights are associated with clearance distances between more than one of the plurality of sleeves interposed between a differing one of the plurality of rods connected to each rib and a differing one of the plurality of shaft openings.

15. The fluid turbine of claim 11, wherein each of the holed tabs is interposed between an associated blade surface and a distal end of an associated one of the aerodynamic sleeves.

16. The fluid turbine of claim 15, wherein a plurality of washers and a threaded nut are interposed between the distal ends of the aerodynamic sleeves and the associated blade surface.

17. The fluid turbine of claim 11, wherein each of the plurality of ribs is contoured to correspond to a contour of an associated internal blade surface.

18. A fluid turbine, comprising:
a shaft disposed in a vertical orientation, the shaft including a plurality of shaft openings extending transversely therethrough;
a plurality of reinforcing sleeves, each reinforcing sleeve of the plurality of reinforcing sleeves extending through a respective shaft opening of the plurality of shaft openings;
a first blade portion, disposed in the vertical orientation on a first side of the shaft;
a second blade portion, disposed in the vertical orientation on a second side of the shaft, opposite the first side;
a plurality of rods, each rod of the plurality of rods extending through the respective shaft opening such that the reinforcing sleeve disposed in the respective shaft opening is interposed between the rod and the respective shaft opening for reinforcing at least one of the shaft, the respective shaft opening, or the rod against forces exerted by the first blade portion and the second blade portion when fluid impacts the first blade portion and the second blade portion, each of the plurality of rods being configured for connection at a first end thereof to the first blade portion, and at a second end thereof to the second blade portion; and
a plurality of horizontal ribs, at least one first horizontal rib of the plurality of horizontal ribs being associated with the first blade portion and at least one second horizontal rib of the plurality of horizontal ribs being associated with the second blade portion, each of the horizontal ribs being connected to more than one of the rods.

* * * * *